United States Patent
Pickett et al.

(10) Patent No.: US 12,492,991 B2
(45) Date of Patent: Dec. 9, 2025

(54) METHODS AND APPARATUS TO GENERATE CALIBRATION MODELS IN A CLOUD ENVIRONMENT

(71) Applicant: Deere & Company, Moline, IL (US)

(72) Inventors: Terence D. Pickett, Waukee, IA (US); Peter Schade, Bad Dürkheim (DE); Broughton Boydell, Pallamallawa (AU); John H. Stone, Bettendorf, IA (US)

(73) Assignee: Deere & Company, Moline, IL (US)

( * ) Notice: Subject to any disclaimer, the term of this patent is extended or adjusted under 35 U.S.C. 154(b) by 622 days.

(21) Appl. No.: 17/645,702

(22) Filed: Dec. 22, 2021

(65) Prior Publication Data

US 2023/0194423 A1   Jun. 22, 2023

(51) Int. Cl.
| | |
|---|---|
| *G01N 21/359* | (2014.01) |
| *G06F 30/27* | (2020.01) |
| *G07C 5/08* | (2006.01) |
| *H04W 4/38* | (2018.01) |
| *H04W 4/40* | (2018.01) |

(52) U.S. Cl.
CPC ........... *G01N 21/359* (2013.01); *G06F 30/27* (2020.01); *G07C 5/085* (2013.01); *G01N 2201/127* (2013.01); *H04W 4/38* (2018.02); *H04W 4/40* (2018.02)

(58) Field of Classification Search
CPC .................................................... G01N 21/359
See application file for complete search history.

(56) References Cited

U.S. PATENT DOCUMENTS

| | | | |
|---|---|---|---|
| 2010/0163333 A1* | 7/2010 | Patil .................... | B62D 15/0245 180/402 |
| 2011/0071807 A1* | 3/2011 | Hubert ................. | G01N 21/359 703/2 |
| 2018/0031421 A1* | 2/2018 | Hsiung .................... | G06F 30/00 |
| 2018/0038712 A1* | 2/2018 | Altrichter ............... | G01S 13/50 |
| 2020/0094849 A1* | 3/2020 | Weber ............... | B60W 50/0225 |
| 2020/0175342 A1* | 6/2020 | Feyerabend ....... | G06F 18/24155 |
| 2021/0247305 A1 | 8/2021 | Schade et al. | |
| 2021/0365114 A1* | 11/2021 | Hewage ................. | G06N 20/00 |
| 2021/0386011 A1 | 12/2021 | Goering | |

FOREIGN PATENT DOCUMENTS

WO      WO 0161617 A1      8/2001

OTHER PUBLICATIONS

CN109902406 (English Machine translated version) (2019).*
Extended European Search Report and Written Opinion issued in European Patent Application No. 22198461.0, dated Apr. 26, 2023, in 10 pages.

* cited by examiner

*Primary Examiner* — Hyun D Park
(74) *Attorney, Agent, or Firm* — Hanley, Flight & Zimmerman, LLC

(57) ABSTRACT

Methods and apparatus to generate calibration models in a cloud environment are disclosed. An example apparatus includes training circuitry to generate a calibration model based on a correlation of reference data and spectra, the reference data based on physical samples collected by one or more vehicles, the spectra associated with the physical samples, and distribution circuitry to provide, via a network communication, the calibration model to the one or more vehicles.

19 Claims, 16 Drawing Sheets

METHODS AND APPARATUS TO GENERATE CALIBRATION MODELS IN A CLOUD ENVIRONMENT

FIELD OF THE DISCLOSURE

This disclosure relates generally to sensor calibration and, more particularly, to methods and apparatus to generate calibration models in a cloud environment.

BACKGROUND

The measurement of constituent materials on the basis of optical spectroscopy, in particular near-infrared spectroscopy, is used in many applications including the foodstuffs industry and agriculture. In agriculture, optical spectroscopy may be used to investigate the state of crops growing on a field, constituent materials of harvested crops, or composition of liquid manure.

SUMMARY

An example apparatus disclosed herein includes training circuitry to generate a calibration model based on a correlation of reference data and spectra, the reference data based on physical samples collected by one or more vehicles, the spectra associated with the physical samples, and distribution circuitry to provide, via a network communication, the calibration model to the one or more vehicles.

An example non-transitory computer readable medium disclosed herein includes instructions that, when executed, cause processor circuitry to at least obtain reference data based on physical samples collected by one or more vehicles, obtain spectra associated with the physical samples, generate a calibration model based on a correlation of the reference data and the spectra, and provide, via a network communication, the calibration model to the one or more vehicles.

An example apparatus disclosed herein includes means for training to generate a calibration model based on a correlation of reference data and spectra, the reference data based on physical samples collected by one or more vehicles, the spectra associated with the physical samples, and means for distributing to provide, via a network communication, the calibration model to the one or more vehicles.

Figure 1A:
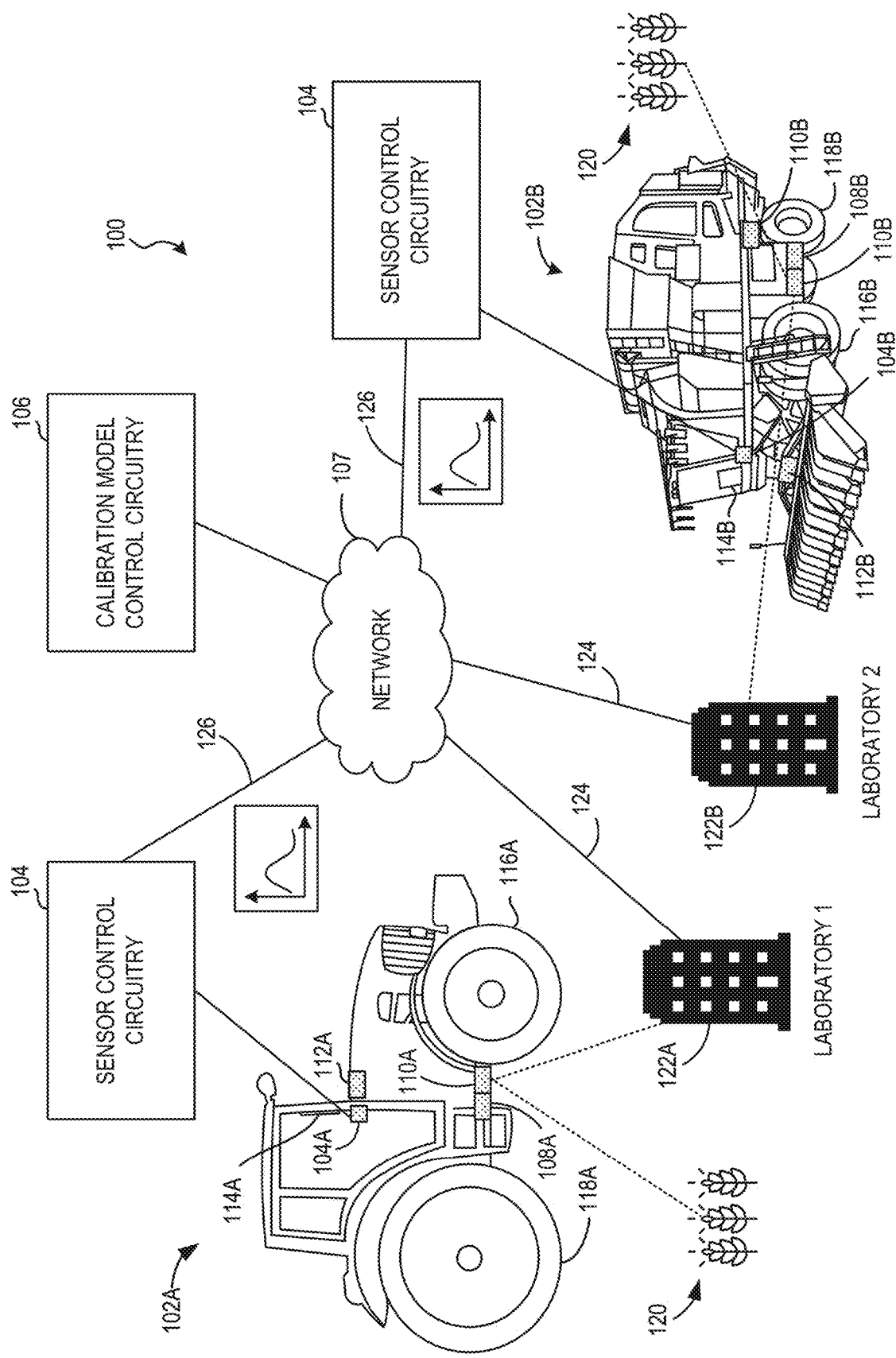
FIG. 1A is a schematic illustration of first and second example vehicles utilizing example sensor control circuitry and example calibration model control circuitry in accordance with teachings of this disclosure.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Agricultural vehicles commonly implement one or more sensors for generating optical measurements. Such optical measurements may be used to quantify constituents of an agricultural sample (e.g., a physical sample). The agricultural sample can include crops growing in a field, harvested crops, liquid manure, etc. The sensors can include a spectrometer (e.g., an optical spectrometer, a near-infrared spectrometer) that produces spectral signals based on intensities of particular wavelengths of light reflected by the agricultural sample. The spectrometer detects light emitted by a light source and reflected from the sample. The spectrometer separates the detected light into its components based on wavelength, and determines the intensities corresponding to particular wavelengths. Processor circuitry can generate one or more spectral signals based on the detected light, where the spectral signals may be used to determine one or more physical characteristics of the corresponding agricultural sample.

In some cases, the spectral signal may be affected by one or more properties and/or physical characteristics of the agricultural sample, such as moisture and other constituents of the sample, temperature of the sample, and/or pH value of the sample. In some cases, the processor circuitry uses one or more calibration models to evaluate the spectral signals. In particular, the processor circuitry can evaluate the spectral signals based on example Equation 1 below.

$$\text{constituent} = f(\text{optical measurement}) \qquad \text{Equation 1}$$

Equation 1 above represents a calibration model (e.g., a calibration function) for use in evaluating the spectral signals. In particular, the processor circuitry inputs optical measurements (e.g., the spectral signals) to the calibration model, and determines and/or predicts one or more constituent materials and/or quantities of the one or more constituent materials based on an output of the calibration model. In some cases, different calibrations models are used for different crop types (e.g., wheat, corn, rye, barley, etc.).

In some cases, the processor circuitry generates the calibrations models based on a learning data set relating spectral signals and associated metadata (e.g., reference data). In such cases, the spectral signals are obtained from optical measurements of agricultural samples, and the metadata includes reference values of the constituent materials that are determined via laboratory testing of the agricultural samples. In some cases, the reference values are obtained using accepted reference methods (e.g., ISO 712:2009). In some examples, the processor circuitry adjusts one or more parameters of the calibration model based on correlation of the spectral signals and the associated metadata.

Typically, a large number of agricultural samples (e.g., 1,000 samples or more) of a given crop type are required for generating an accurate calibration model for the given crop type. However, given the substantial costs and time required to obtain results of laboratory testing for each of the agricultural samples, calibration models for some crop types may not be available. Furthermore, for some known spectrometers and associated processor circuitry, the calibration models are preloaded onto the spectrometer and/or the associated processor circuitry prior to implementation on a vehicle. In such cases, an operator can update the calibration models during a field visit to the vehicle, and delays between such field visits may result in the calibration models being outdated and/or inaccurate.

Examples disclosed herein provide a cloud-based system for generating and/or updating calibration models using data from a plurality of interconnected vehicles. Example processor circuitry is implemented in a cloud environment and communicatively coupled to each vehicle in the plurality of interconnected vehicles. In some examples, in response to collecting a physical sample from a field, each vehicle can gather spectra associated with the physical sample using a spectrometer implemented on the vehicle. The vehicle provides the spectra to the processor circuitry via a network communication and provides the physical sample to a laboratory for analytical testing. The processor circuitry obtains results of the analytical testing as reference data associated with the physical sample.

In some examples, the processor circuitry generates and/or trains a calibration model based on a correlation of the reference data and the spectra, where the calibration model is, for example, a neural network model. In some examples, the processor circuitry selects an initial model based on an identified crop type of the physical sample, where the initial model corresponds to a crop type that is the same as or similar to the identified crop type of the physical sample. In such examples, the processor circuitry can generate the calibration model for the identified crop type by re-training the initial model based on the correlation of the reference data and the spectra. In some examples, the processor circuitry predicts, based on the calibration model, a value of one or more physical characteristics associated with the physical sample. In some examples, the processor circuitry outputs a measurement uncertainty associated with the predicted value. In some such examples, the measurement uncertainty indicates an expected range of deviation between the predicted value and a reference value for the same sample. Furthermore, the processor circuitry can provide the calibration model to the plurality of vehicles, and the processor circuitry can continuously and/or periodically update the calibration model based on new spectra and/or new reference data obtained by the vehicles.

Advantageously, examples disclosed herein enable crowdsourcing of data from multiple vehicles that may traverse different locations and/or crop types. In such examples, the processor circuitry can improve accuracy of one or more calibration models by continuously and/or periodically re-training the calibration models based on the crowdsourced data. Examples disclosed herein can generate the calibration models based on existing calibration models for similar crop types, thus enabling generation of the calibration models for which limited samples are available. As such, examples disclosed herein may reduce the number of samples required, thereby reducing the time and costs required for gathering and testing of the samples.

FIG. 1 is a schematic illustration of an example environment 100 including a first example vehicle 102A and a second example vehicle 102B. In the illustrated example of FIG. 1A, the first vehicle 102A utilizes first example sensor control circuitry 104A, and the second vehicle 102B utilizes second example sensor control circuitry 104B. In this example, the first and second sensor control circuitry 104A, 104B are communicatively coupled to example calibration model control circuitry 106 via an example network 107. In other examples, the calibration model control circuitry 106 may be implemented locally by each of the first and second sensor control circuitry 104A, 104B.

In the example of FIG. 1A, the first vehicle 102A includes an example sensor 108A, an example sampling system 110A, an example Global Positioning System (GPS) receiver 112A, an example user interface 114A, front wheels (one of which is shown at reference numeral 116A), and rear wheels (one of which is shown at reference numeral 118A). The second vehicle 102B includes an example sensor 108B, an example sampling system 110B, an example Global Positioning System (GPS) receiver 112B, an example user interface 114B, front wheels (one of which is shown at reference numeral 116B), and rear wheels (one of which is shown at reference numeral 118B).

As used herein, when referring to "the vehicle 102," it is to be understood that the description and/or illustration applies to both the first vehicle 102A and the second vehicle 102B. Similarly, when referring to any one or more of the components of the first vehicle 102A or the second vehicle 102B, if a component is discussed (e.g., the sensor control circuitry 104, the sensor 108, the sampling system 110, the GPS receiver 112, the user interface 114, the front wheel 116, the rear wheel 118, etc.), it is to be understood that the illustration and/or description applies to these respective parts on both of the first vehicle 102A and the second vehicle 102B.

As illustrated and described herein, the structure and/or function of any one of the sensor control circuitry 104B, the sensor 108B, the sampling system 110, the GPS receiver 112B, the user interface 114B, the front wheels (e.g., the front wheel 116B), and/or the rear wheels (e.g., the rear wheel 118B), may be the same as the corresponding component on the first vehicle 102A. Therefore, for example, description and/or illustration associated with the first sensor control circuitry 104A of the first vehicle 102A can be considered to apply equally to the second sensor control circuitry 104B of the second vehicle 102B.

In the example illustrated in FIG. 1A, the first vehicle 102A is a tractor and the second vehicle 102B is a cotton stripper. However, the first vehicle 102A and the second vehicle 102B may be any type of vehicle (e.g., a tractor, front loader, harvester, cultivator, or any other suitable vehicle) configured to traverse a field. For example, the first vehicle 102A may be a tractor capable of automatically tracking a row of crops to harvest the row of crops. The first vehicle 102A and/or the second vehicle 102B may be a front wheel steer vehicle or a rear wheel steer vehicle. As used herein, a front wheel steer vehicle steers by pivoting its front wheels (such as the front wheel 116A) with respect to a vehicle frame, while a rear wheel steer vehicle steers by pivoting its rear wheels (such as the rear wheel 118B) with respect to a vehicle frame. In some examples, the vehicle 102 may be implemented as an articulated vehicle that includes a different steering system as compared to front wheel and/or rear wheel steer vehicles.

In the illustrated example of FIG. 1A, the first vehicle 102A is implemented as a front wheel steer vehicle. As such, the first vehicle 102A turns in response to pivoting of the front wheel 116A. For example, if the user or an autonomous driving system decides to turn left, the front wheel 116A is pivoted to the left. The second vehicle 102B is implemented as a rear wheel steer vehicle. As such, the second vehicle 102B turns in response to pivoting of the rear wheel 118B. In examples disclosed herein, the front wheels 116A, 116B are located on a front wheel axle with one or more additional corresponding front wheels. Likewise, in examples disclosed herein, the rear wheels 118A, 118B are located on a rear wheel axle with one or more additional corresponding rear wheels.

Figure 1B:
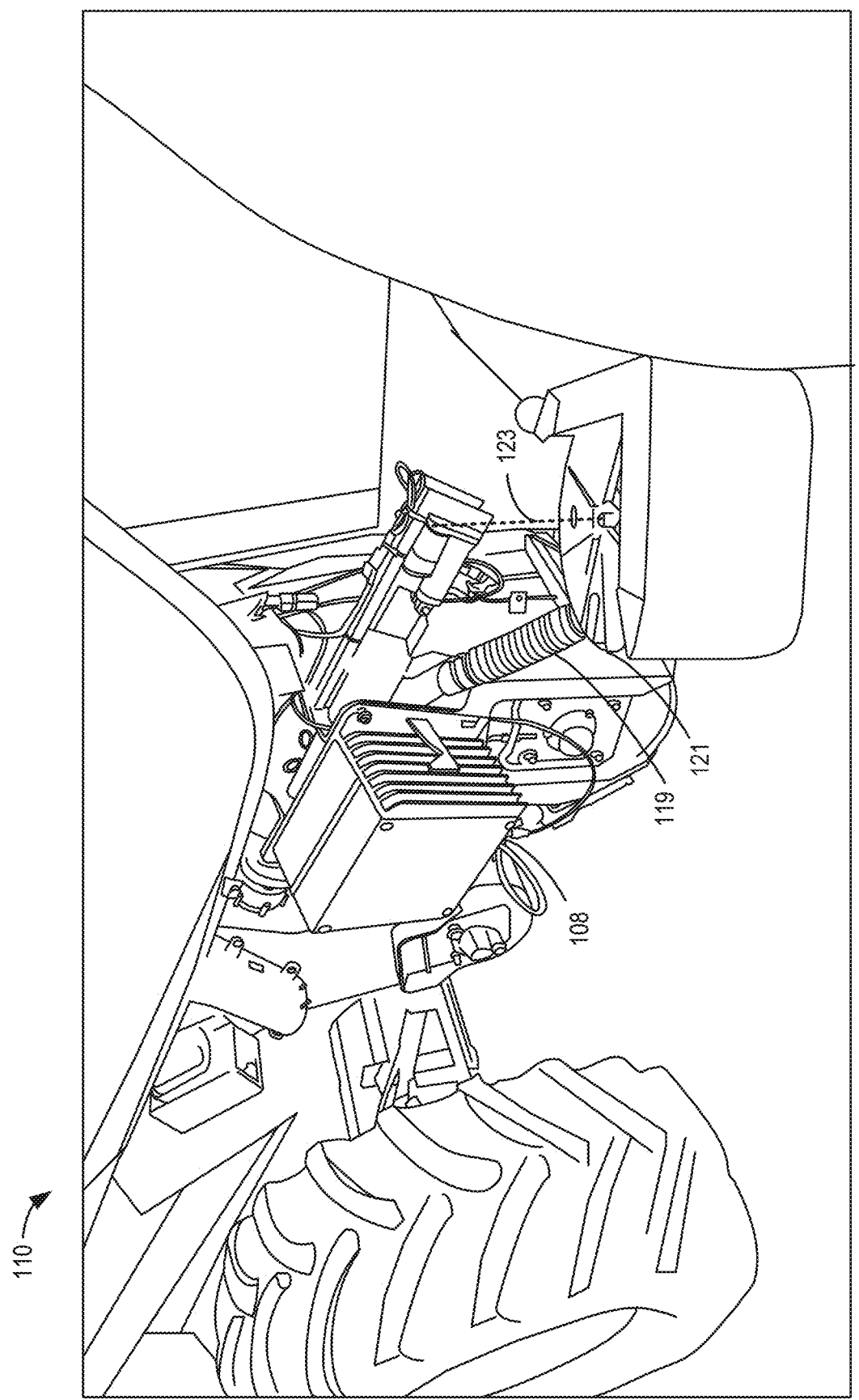
FIG. 1B illustrates an example sampling system that may be implemented on the first and second example vehicles of FIG. 1A.

In the illustrated example of FIG. 1A, the sampling system 110 collects example physical samples 120 from the field traversed by the vehicle 102. In some examples, the sampling system 110 can collect the physical samples 120 when the vehicle 102 is moving or stationary on the field. For example, FIG. 1B is a detailed view of the example sampling system 110 of FIG. 1A. In the illustrated example of FIG. 1B, during collection of the physical samples 120, the sampling system 110 can direct harvested crop flow through the sampling system 110 to a position in front of a sampling window where the sensor 108 is mounted. In some examples, the sampling system 110 diverts a portion of the harvested crop flow via an example tube 119 to one or more example containers (e.g., bottles, buckets, bags, etc.) 121 to be stored as the physical samples 120. In this example, the sampling system 110 is configured as a revolver-type sampling system. As such, in response to the sampling system 110 filling a first one of the containers 121, the containers 121 are rotated about an example axis 123 such that the sampling system 110 can direct the portion of the harvested crop flow to a second one of the containers 121. In some such examples, the physical samples 120 in different ones of the containers 121 may be collected from different crops and/or from different locations in a field.

In the illustrated example of FIG. 1B, the sampling system 110 is implemented on a combine, and the physical samples 120 include harvested crops (e.g., grain) from the field. In other examples, the sampling system 110 can be implemented separately from the vehicle 102 to sample manure, liquid fertilizer, etc. In some examples, the sampling system 110 collects the physical samples 120 in response to a trigger signal from the sensor control circuitry 104 of FIG. 1A. In some examples, the operator of the vehicle 102 can retrieve the physical samples 120 from the corresponding containers 121 at a later time.

Returning to FIG. 1A, the physical samples 120 collected by the sampling system 110 may be provided to one or more example laboratories 122A, 122B. In some examples, the laboratories 122A, 122B can perform one or more tests (e.g., reference analytics) on the physical samples to determine physical characteristics thereof. For example, the laboratories 122A, 122B can determine one or more constituents (e.g., protein, starch, nitrogen, oil, fiber, etc.) in the physical samples 120. The laboratories 122A, 122B can also determine quantities and/or proportions of the one or more constituents and/or one or more additional physical characteristics (e.g., moisture level, pH level, protein content, etc.) of the physical samples 120. In some examples, the laboratories 122A, 122B provide results of the testing of the physical samples 120 as example reference data 124 to the calibration model control circuitry 106. Additionally or alternatively, the reference data 124 can be generated by performing testing of the physical samples 120 using one or more additional sensors. For example, while the sensor 108 in the illustrated example of FIG. 1 is a reflective sensor, the physical samples 120 can additionally or alternatively be tested using a transmission sensor implemented on and/or separate from the vehicle 102. In some examples, the transmission sensor has an increased sensitivity and/or accuracy compared to the reflective sensor (e.g., the sensor 108). As such, the transmission sensor can be used to independently test the physical samples 120 to obtain the reference data 124 therefrom.

In the illustrated example of FIG. 1A, the sensor 108 is a near infrared (NIR) spectrometer that gathers example spectra 126 associated with the physical samples 120 from a stream of harvested material in the sampling system 110. For example, a light source emits light toward the physical samples 120, and the sensor 108 detects the light reflected from the physical samples 120. In some examples, the sensor 108 includes a dispersive element (e.g., a prism, a filter, a grating, etc.) that deflects the light from the light source in a plurality of directions based on wavelengths of the light. In some examples, the sensor 108 generates the spectra 126 based on the detected light, where the spectra 126 represent information regarding intensities of different wavelengths of the emitted light from the light source and/or of the reflected light detected by the light detector. In some examples, the sensor control circuitry 104 receives the spectra 126 from the sensor 108, and further provides the spectra 126 to the calibration model control circuitry 106 for use in generating calibration models. In some examples, the sensor 108 generates the spectra 126 based on the physical samples 120 gathered and/or stored by the sampling system 110. In other examples, the physical samples 120 are not collected by the sampling system 110, and the sensor 108 generates the spectra 126 by detecting light directly emitted toward and reflected from the field.

In the illustrated example of FIG. 1A, the GPS receiver 112 communicates with the sensor control circuitry 104 to provide and/or otherwise transmit position data (e.g., a current position of the vehicle 102) thereto. In some examples, the GPS receiver 112 samples the current position of the vehicle 102 at a threshold interval. For example, every 0.1 seconds, the GPS receiver 112 may send the current position to the sensor control circuitry 104. In this example, the GPS receiver 112 detects the current position at which the sensor 108 obtains the spectra 126 and/or the sampling system 110 collects the physical samples 120. In some examples, the sensor control circuitry 104 stores the current position of the vehicle 102 in association with the spectra 126 generated by the sensor 108 at the current position and/or the physical samples 120 gathered by the sampling system 110 at the current position. Additionally or alternatively, the sensor control circuitry 104 infers and/or otherwise determines, based on the spectra 126, physical characteristics of the physical samples 120, and stores the determined physical characteristics in association with positions at which the physical samples 120 were obtained. In some examples, the sensor control circuitry 104 can store the physical characteristics in association with an area of a field corresponding to a particular crop type of the physical samples 120.

In the illustrated example of FIG. 1A, the user interface 114 displays information to an operator of the vehicle 102 and/or enables the operator to provide inputs to the sensor control circuitry 104. In some examples, the user interface 114 is implemented by a liquid crystal display (LCD) touch screen such as a tablet, a computer monitor, etc. In the example of FIG. 1A, the user interface 114 is an interactive display on which the operator may select and/or enter desired inputs (e.g., select a screen display, enter desired vehicle speed, select a sampling interval, power on and/or off the vehicle, etc.) before, during, and/or after operation of the vehicle 102. In some examples, using the user interface 114, the operator of the vehicle 102 can trigger the sensor 108 to generate the spectra 126 and/or trigger the sampling system 110 to collect the physical samples 120. In some examples, the user interface 114 displays one or more of the characteristics (e.g., temperature, pH value, moisture, etc.) associated with the physical samples 120.

In some examples, the user interface 114 includes an indicator (e.g., a confidence indicator, an uncertainty indicator) to display a measurement uncertainty associated with the calibration model utilized by the sensor control circuitry 104. For example, the indicator can include one or more light indicators having different colors, where each color corresponds to a different measurement uncertainty. In some examples, the measurement uncertainty is associated with a predicted value output by the calibration model, where the predicted value is an estimate for at least one of the physical characteristics (e.g., moisture level, protein content, etc.) associated with the physical samples 120. In some examples, the measurement uncertainty corresponds to a particular confidence level (e.g., 90%). For example, for a measurement uncertainty of ±1% associated with a 90% confidence level, a deviation between the reference value and the predicted value is less than the measurement uncertainty (e.g., less than 1%) in 90% of samples. In other examples, the physical characteristic (e.g., the moisture level), the confidence level (e.g., 90%), the predicted value (e.g., 10%), and/or the measurement uncertainty (e.g., ±1%) may be different based on the calibration model used and/or based on the data input to the calibration model.

In some examples, the sensor control circuitry 104 illuminates a first one of the light indicators having a first color (e.g., green) to indicate a low relative uncertainty (e.g., 1% relative uncertainty, etc.). In some examples, the sensor control circuitry 104 illuminates a second one of the light indicators having a second color (e.g., yellow) to indicate a medium relative uncertainty (e.g., 10% relative uncertainty, etc.), and illuminates a third one of the light indicators having a third color (e.g., red) to indicate a high relative uncertainty (e.g., 20% relative uncertainty). In some examples, the user interface 114 also displays the predicted value and/or the relatively uncertainty associated with the predicted value. In some examples, the sensor control circuitry 104 can direct the sampling system 110 to collect and/or store one of the physical samples 120 in response to the predicted value associated therewith having a high relative uncertainty.

In the illustrated example of FIG. 1A, the sensor control circuitry 104 analyzes the spectra 126 associated with the physical samples 120 collected by the sampling system 110. For example, the sensor control circuitry 104 analyzes the spectra 126 using a calibration model to identify one or more constituent materials in the physical samples 120 and/or to determine one or more characteristics (e.g., temperature, pH value, etc.) of the constituent materials. In some examples, the sensor control circuitry 104 obtains the calibration model generated and/or updated by the calibration model control circuitry 106. In other examples, the calibration model is preloaded on the sensor control circuitry 104.

In the illustrated example of FIG. 1A, the sensor control circuitry 104 is communicatively coupled to the calibration model control circuitry 106 via the network 107. In this example, the calibration model control circuitry 106 generates and/or retrains one or more calibration models based on the spectra 126 obtained by the sensor 108 and/or based on the reference data 124 from the physical samples 120. For example, the reference data 124 may be obtained by laboratory analysis of the physical samples 120, where the reference data 124 indicates one or more reference characteristics and/or one or more reference constituents of the physical samples 120. In some examples, the calibration model control circuitry 106 associates the reference data 124 with the corresponding spectra 126, and trains one or more neural networks to predict and/or otherwise output the reference data 124 based on the corresponding spectra 126. In some examples, the calibration model control circuitry 106 stores the trained calibration models and/or provides the trained calibration models to the sensor control circuitry 104.

Figure 2:
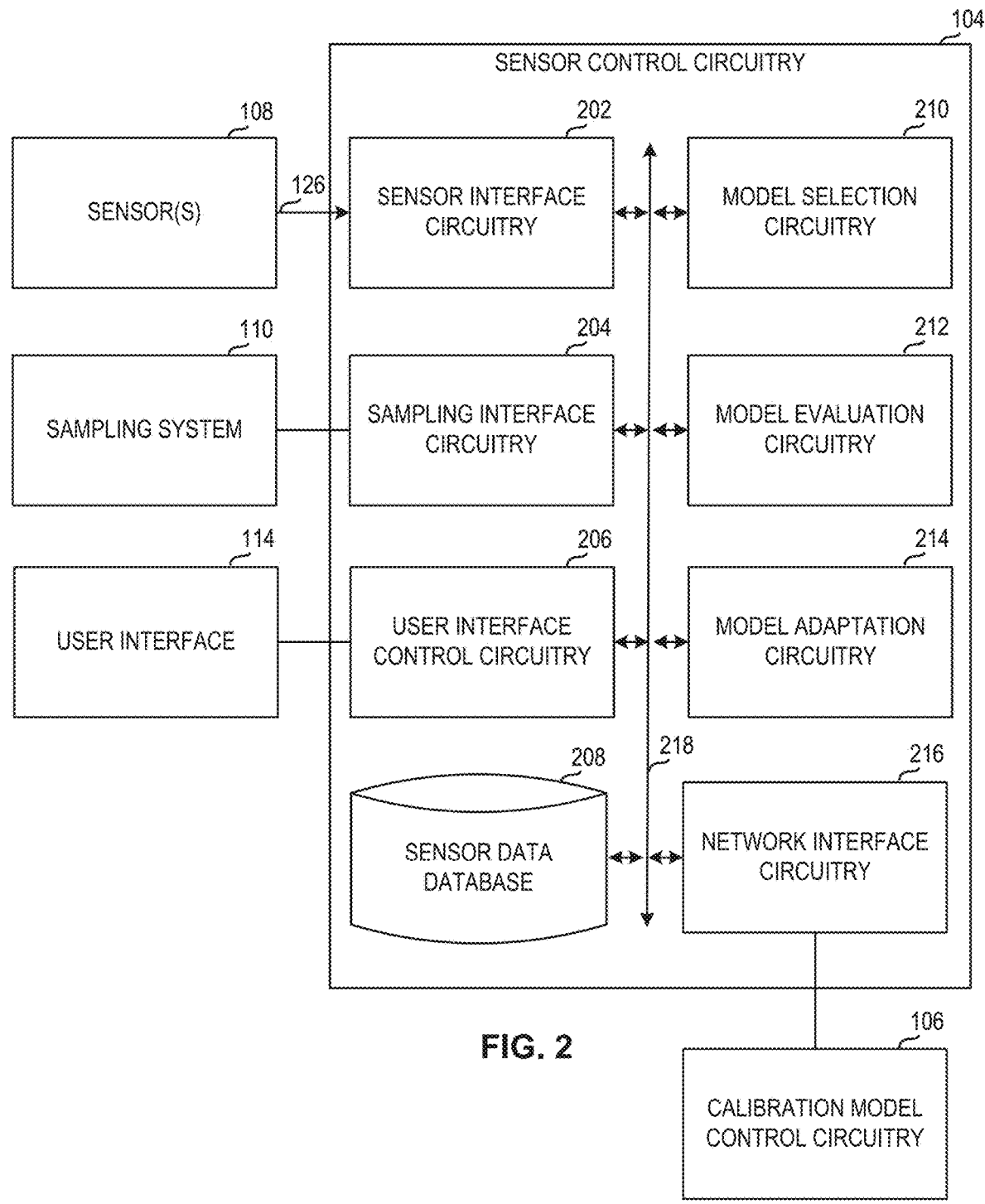
FIG. 2 is a block diagram of the example sensor control circuitry of FIG. 1A.

FIG. 2 is a block diagram of the example sensor control circuitry 104 of FIG. 1A. In some examples, the sensor control circuitry 104 gathers and/or analyzes the spectra 126 from the sensor 108 and evaluates one or more calibration models based on the spectra 126. In the illustrated example of FIG. 2, the sensor control circuitry 104 includes example sensor interface circuitry 202 communicatively and/or operatively coupled to the sensor(s) 108, example sampling interface circuitry 204 communicatively and/or operatively coupled to the sampling system 110, example user interface control circuitry 206 communicatively and/or operatively coupled to the user interface 114, an example sensor data database 208, example model selection circuitry 210, example model evaluation circuitry 212, example model adaptation circuitry 214, and example network interface circuitry 216 communicatively coupled to the calibration model control circuitry 106.

In the illustrated example of FIG. 2, any of the sensor interface circuitry 202, the sampling interface circuitry 204, the user interface control circuitry 206, the sensor data database 208, the model selection circuitry 210, the model evaluation circuitry 212, the model adaptation circuitry 214, and/or the network interface circuitry 216 can communicate via an example communication bus 218. In examples disclosed herein, the communication bus 218 may be implemented using any suitable wired and/or wireless communication. In additional or alternative examples, the communication bus 218 may transmit software, machine readable instructions, and/or communication protocols by which information is communicated among the sensor interface circuitry 202, the sampling interface circuitry 204, the user interface control circuitry 206, the sensor data database 208, the model selection circuitry 210, the model evaluation circuitry 212, the model adaptation circuitry 214, and/or the network interface circuitry 216.

In the illustrated example of FIG. 2, the sensor data database 208 stores data utilized and/or obtained by the sensor 108 and/or stores one or more calibration models utilized by the sensor control circuitry 104. The example sensor data database 208 of FIG. 2 is implemented by any memory, storage device and/or storage disc for storing data such as, for example, flash memory, magnetic media, optical media, solid state memory, hard drive(s), thumb drive(s), etc. Furthermore, the data stored in the example sensor data database 208 may be in any data format such as, for example, binary data, comma delimited data, tab delimited data, structured query language (SQL) structures, etc. While, in the illustrated example, the example sensor data database 208 is illustrated as a single device, the example sensor data database 208 and/or any other data storage devices described herein may be implemented by any number and/or type(s) of memories.

The sensor interface circuitry 202 controls and/or directs the sensor 108 to obtain and/or measure the spectra 126 associated with the physical samples 120 of FIG. 1A. For example, the sensor interface circuitry 202 directs a light source to emit light towards the physical samples 120, and directs the sensor 108 to detect the light reflected from the physical samples 120 to generate the spectra 126. In some examples, the sensor interface circuitry 202 directs the sensor 108 to obtain the spectra 126 in response to the user interface control circuitry 206 receiving a request via the user interface 114. In this example, the sensor interface circuitry 202 obtains the spectra 126 from the sensor 108 and provides the spectra 126 to the sensor data database 208 for storage therein. Additionally or alternatively, the sensor interface circuitry 202 provides the spectra 126 to the network interface circuitry 216 for sending to the calibration model control circuitry 106 via the network 107 of FIG. 1A. In some examples, the sensor interface circuitry 202 can modify one or more sensor parameters associated with the sensor 108, where the one or more sensor parameters can include a wavelength of the light emitted from the light source.

The sampling interface circuitry 204 controls and/or operates the sampling system 110 to collect the physical samples 120. For example, the physical samples 120 can include soil samples and/or harvested crops from a field traversed by the vehicle 102 of FIG. 1A. In some examples, the sampling interface circuitry 204 directs the sampling system 110 to obtain the physical samples 120 in response to the user interface control circuitry 206 receiving a request from the user interface 114. In other examples, the sampling interface circuitry 204 directs the sampling system 110 to obtain the physical samples 120 based on a current position of the vehicle 102. In some such examples, a map of a work area to be traversed by the vehicle 102 is preloaded in the sampling interface circuitry 204, where the map indicates locations at which the physical samples 120 are to be collected. In such examples, the sampling interface circuitry 204 monitors the current position of the vehicle 102 based on GPS data gathered by the GPS receiver 112 of FIG. 1 and, in response to determining that the current position of the vehicle 102 is at one of the locations identified in the map, the sampling interface circuitry 204 directs the sampling system 110 to gather one or more of the physical samples 120.

The user interface control circuitry 206 obtains, via the user interface 114, one or more requests from an operator of the vehicle 102. For example, the one or more requests can include a request for the sampling system 110 to collect one or more of the physical samples 120 and/or a request for the sensor 108 to obtain the spectra 126 associated with the physical samples 120. In some examples, the one or more requests can include a request to determine and/or estimate one or more characteristics of the physical samples 120 by evaluating a calibration model based on the associated spectra 126.

In some examples, the user interface control circuitry 206 controls a display of the user interface 114. For example, in response to the model evaluation circuitry 212 evaluating a calibration model to determine one more characteristics of the physical sample, the user interface control circuitry 206 causes the user interface 114 to display values of the one or more characteristics. For example, the user interface control circuitry 206 can cause the user interface 114 to display descriptions of the one or more constituents of the physical samples 120, quantities and/or proportions associated with one or more constituents, moisture in the physical samples 120, etc. Additionally or alternatively, the user interface control circuitry 206 can cause the user interface 114 to indicate a measurement uncertainty, where the measurement uncertainty is associated with the predicted characteristics obtained based on the calibration model utilized by the model evaluation circuitry 212. In some examples, the measurement uncertainty is based on a quantity of the physical samples 120 and/or the spectra 126 used to generate and/or train the calibration model. In some examples, the user interface 114 includes an indicator to indicate the measurement uncertainty, where the indicator includes one or more light indicators. For example, the user interface control circuitry 206 turns on (e.g., illuminates) a first one of the light indicators having a first color (e.g., green) to indicate a low measurement uncertainty of the predicted characteristics, a second one of the light indicators having a second color (e.g., yellow) to indicate a medium measurement uncertainty, or a third one of the light indicators having a third color (e.g., red) to indicate a high measurement uncertainty. In some examples, the user interface control circuitry 206 causes the user interface 114 to display the measurement uncertainty in association with the predicted characteristics.

The model selection circuitry 210 selects the calibration model to be utilized by the model evaluation circuitry 212 for determining one or more characteristics of the physical samples 120. For example, the model selection circuitry 210 identifies, based on a request received at the user interface control circuitry 206, the one or more desired characteristics that are to be determined. The model selection circuitry 210 selects, from one or more calibration models stored in the sensor data database 208, the calibration model that outputs the desired characteristics. In some examples, in response to determining that the sensor data database 208 does not include a calibration model that outputs the desired characteristics, the model selection circuitry 210 directs the network interface circuitry 216 to obtain a new calibration model from the calibration model control circuitry 106.

The example model evaluation circuitry 212 evaluates the calibration model selected by the model selection circuitry 210. For example, the model evaluation circuitry 212 predicts contents of one of more constituent materials in the physical sample 120 by evaluating the calibration model based on the spectra 126. In response to the model evaluation circuitry 212 evaluating the calibration model, the model evaluation circuitry 212 outputs estimated values for the desired characteristics. In some examples, the calibration model also indicates measurement uncertainty corresponding to each of the desired characteristics. The model evaluation circuitry 212 provides the estimated characteristics to the sensor data database 208 for storage and/or to the user interface control circuitry 206 to display via the user interface 114.

The model adaptation circuitry 214 adapts and/or modifies the calibration model based on sensor characteristics of the sensor 108. In some examples, the model adaptation circuitry 214 obtains, from the calibration model control circuitry 106, a generalized calibration model corresponding to the desired characteristics to be determined and/or corresponding to a crop type of the physical samples 120. In some such examples, the model adaptation circuitry 214 modifies the generalized calibration model to generate a refined calibration model specific to the sensor 108. For example, the model adaptation circuitry 214 performs a local refinement of the generalized calibration model by further training the generalized calibration model based on the spectra 126 from the particular sensor 108. In some examples, the model adaptation circuitry 214 provides the refined calibration model to the model evaluation circuitry 212 for evaluation therein, and/or provides the refined calibration model to the sensor data database 208 for storage.

The example network interface circuitry 216 sends information to and/or receives information from the calibration model control circuitry 106. For example, the network interface circuitry 216 sends and/or otherwise provides the spectra 126 to the calibration model control circuitry 106 for use in generating and/or training one or more calibration models. Furthermore, the network interface circuitry 216 receives and/or otherwise obtains the one or more calibration models from the calibration model control circuitry 106. In some examples, the network interface circuitry 216 periodically obtains updated calibration models from the calibration model control circuitry 106 and/or receives the updated calibration models in response to a request from the user interface 114.

In some examples, the sensor control circuitry 104 includes means for interfacing with a sensor. For example, the means for interfacing with a sensor may be implemented by the sensor interface circuitry 202. In some examples, the sensor interface circuitry 202 may be implemented by machine executable instructions such as that implemented by at least block 904 of FIG. 9 executed by processor circuitry, which may be implemented by the example processor circuitry 1112 of FIG. 11, the example processor circuitry 1300 of FIG. 13, and/or the example Field Programmable Gate Array (FPGA) circuitry 1400 of FIG. 14. In other examples, the sensor interface circuitry 202 is implemented by other hardware logic circuitry, hardware implemented state machines, and/or any other combination of hardware, software, and/or firmware. For example, the sensor interface circuitry 202 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the sensor control circuitry 104 includes means for controlling a sampling system. For example, the means for controlling a sampling system may be implemented by the sampling interface circuitry 204. In some examples, the sampling interface circuitry 204 may be implemented by machine executable instructions such as that implemented by at least block 906 of FIG. 9 executed by processor circuitry, which may be implemented by the example processor circuitry 1112 of FIG. 11, the example processor circuitry 1300 of FIG. 13, and/or the example Field Programmable Gate Array (FPGA) circuitry 1400 of FIG. 14. In other examples, the sampling interface circuitry 204 is implemented by other hardware logic circuitry, hardware implemented state machines, and/or any other combination of hardware, software, and/or firmware. For example, the sampling interface circuitry 204 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the sensor control circuitry 104 includes means for obtaining a request. For example, the means for obtaining a request may be implemented by the user interface control circuitry 206. In some examples, the user interface control circuitry 206 may be implemented by machine executable instructions such as that implemented by at least blocks 902, 910, 916 of FIG. 9 executed by processor circuitry, which may be implemented by the example processor circuitry 1112 of FIG. 11, the example processor circuitry 1300 of FIG. 13, and/or the example Field Programmable Gate Array (FPGA) circuitry 1400 of FIG. 14. In other examples, the user interface control circuitry 206 is implemented by other hardware logic circuitry, hardware implemented state machines, and/or any other combination of hardware, software, and/or firmware. For example, the user interface control circuitry 206 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the sensor control circuitry 104 includes means for selecting. For example, the means for selecting may be implemented by the model selection circuitry 210. In some examples, the model selection circuitry 210 may be implemented by machine executable instructions such as that implemented by at least block 908 of FIG. 9 executed by processor circuitry, which may be implemented by the example processor circuitry 1112 of FIG. 11, the example processor circuitry 1300 of FIG. 13, and/or the example Field Programmable Gate Array (FPGA) circuitry 1400 of FIG. 14. In other examples, the model selection circuitry 210 is implemented by other hardware logic circuitry, hardware implemented state machines, and/or any other combination of hardware, software, and/or firmware. For example, the model selection circuitry 210 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the sensor control circuitry 104 includes means for evaluating. For example, the means for evaluating may be implemented by the model evaluation circuitry 212. In some examples, the model evaluation circuitry 212 may be implemented by machine executable instructions such as that implemented by at least blocks 912, 914 of FIG. 9 executed by processor circuitry, which may be implemented by the example processor circuitry 1112 of FIG. 11, the example processor circuitry 1300 of FIG. 13, and/or the example Field Programmable Gate Array (FPGA) circuitry 1400 of FIG. 14. In other examples, the model evaluation circuitry 212 is implemented by other hardware logic circuitry, hardware implemented state machines, and/or any other combination of hardware, software, and/or firmware. For example, the model evaluation circuitry 212 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the sensor control circuitry 104 includes means for adapting. For example, the means for adapting may be implemented by the model adaptation circuitry 214. In some examples, the model adaptation circuitry 214 may be implemented by machine executable instructions such as that implemented by at least block 908 of FIG. 9 executed by processor circuitry, which may be implemented by the example processor circuitry 1112 of FIG. 11, the example processor circuitry 1300 of FIG. 13, and/or the example Field Programmable Gate Array (FPGA) circuitry 1400 of FIG. 14. In other examples, the model adaptation circuitry 214 is implemented by other hardware logic circuitry, hardware implemented state machines, and/or any other combination of hardware, software, and/or firmware. For example, the model adaptation circuitry 214 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the sensor control circuitry 104 includes means for communicating. For example, the means for communicating may be implemented by the network interface circuitry 216. In some examples, the network interface circuitry 216 may be implemented by machine executable instructions such as that implemented by at least block 908 of FIG. 9 executed by processor circuitry, which may be implemented by the example processor circuitry 1112 of FIG. 11, the example processor circuitry 1300 of FIG. 13, and/or the example Field Programmable Gate Array (FPGA) circuitry 1400 of FIG. 14. In other examples, the network interface circuitry 216 is implemented by other hardware logic circuitry, hardware implemented state machines, and/or any other combination of hardware, software, and/or firmware. For example, the network interface circuitry 216 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the sensor control circuitry 104 of FIG. 1 is illustrated in FIG. 2, one or more of the elements, processes, and/or devices illustrated in FIG. 2 may be combined, divided, re-arranged, omitted, eliminated, and/or implemented in any other way. Further, the example sensor interface circuitry 202, the example sampling interface circuitry 204, the example user interface control circuitry 206, the example sensor data database 208, the example model selection circuitry 210, the example model evaluation circuitry 212, the example model adaptation circuitry 214, the example network interface circuitry 216, and/or, more generally, the example sensor control circuitry 104 of FIG. 2, may be implemented by hardware, software, firmware, and/or any combination of hardware, software, and/or firmware. Thus, for example, any of the example sensor interface circuitry 202, the example sampling interface circuitry 204, the example user interface control circuitry 206, the example sensor data database 208, the example model selection circuitry 210, the example model evaluation circuitry 212, the example model adaptation circuitry 214, the example network interface circuitry 216, and/or, more generally, the example sensor control circuitry 104, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example sensor interface circuitry 202, the example sampling interface circuitry 204, the example user interface control circuitry 206, the example sensor data database 208, the example model selection circuitry 210, the example model evaluation circuitry 212, the example model adaptation circuitry 214, and/or the example network interface circuitry 216 is/are hereby expressly defined to include a non-transitory computer readable storage device or storage disk such as a memory, a digital versatile disk (DVD), a compact disk (CD), a Blu-ray disk, etc., including the software and/or firmware. Further still, the example sensor control circuitry 104 of FIG. 1 may include one or more elements, processes, and/or devices in addition to, or instead of, those illustrated in FIG. 2, and/or may include more than one of any or all of the illustrated elements, processes and devices.

Figure 3:
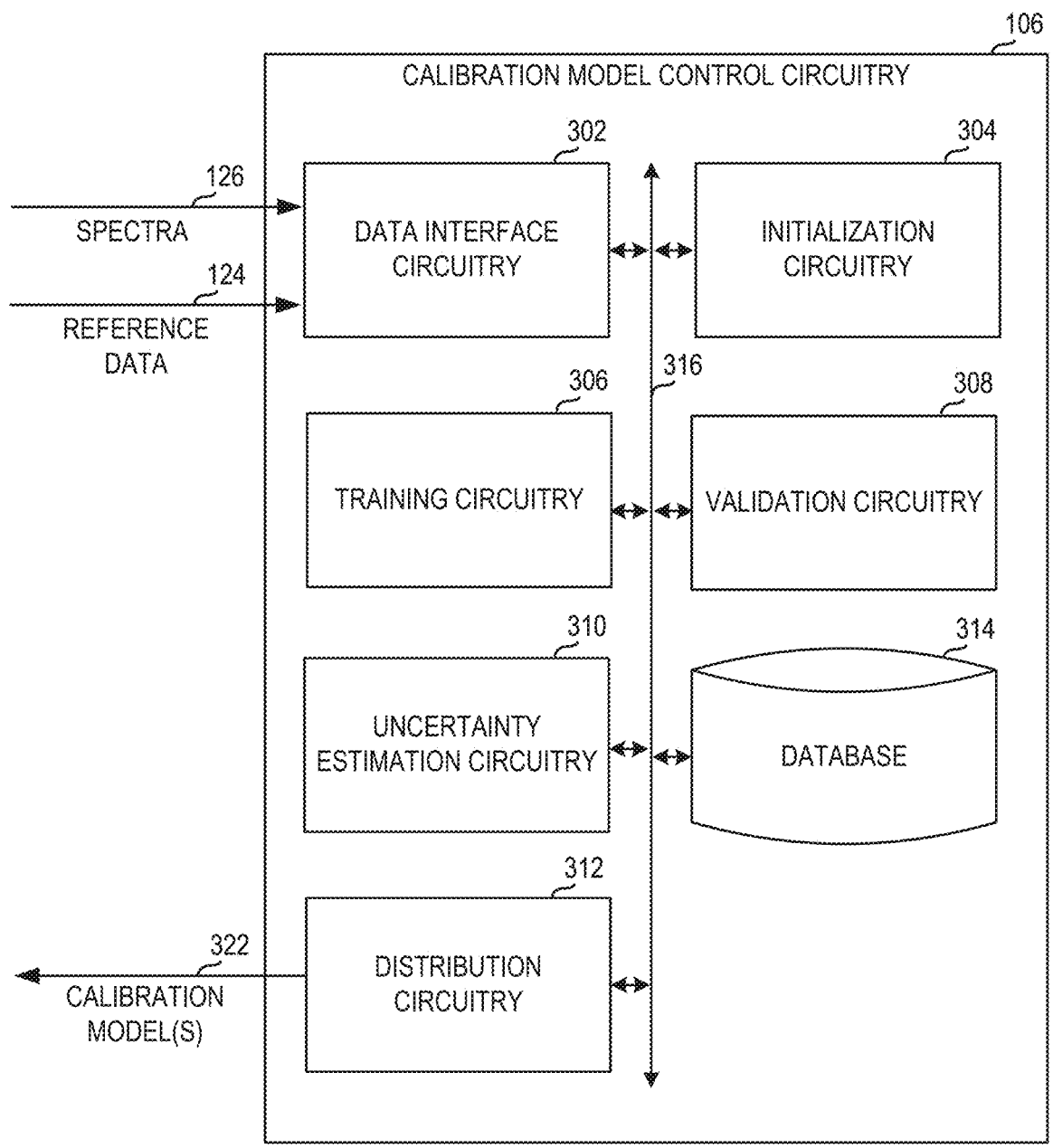
FIG. 3 is a block diagram of the example calibration model control circuitry of FIG. 1A.

FIG. 3 is a block diagram of the example calibration model control circuitry 106 of FIGS. 1A and/or 2. In this example, the calibration model control circuitry 106 is implemented in a cloud environment and is communicatively coupled to the sensor control circuitry 104 of FIG. 2 via the network 107 of FIG. 1A. In the illustrated example of FIG. 3, the calibration model control circuitry 106 includes example data interface circuitry 302, example initialization circuitry 304, example training circuitry 306, example validation circuitry 308, example uncertainty estimation circuitry 310, example distribution circuitry 312, and an example database 314.

In the illustrated example of FIG. 3, any of the data interface circuitry 302, the initialization circuitry 304, the training circuitry 306, the validation circuitry 308, the uncertainty estimation circuitry 310, the distribution circuitry 312, and/or the database 314 can communicate via an example communication bus 316. In examples disclosed herein, the communication bus 316 may be implemented using any suitable wired and/or wireless communication. In additional or alternative examples, the communication bus 316 includes software, machine readable instructions, and/or communication protocols by which information is communicated among the data interface circuitry 302, the initialization circuitry 304, the training circuitry 306, the validation circuitry 308, the uncertainty estimation circuitry 310, the distribution circuitry 312, and/or the database 314.

In the illustrated example of FIG. 3, the database 314 stores the spectra 126 obtained from the sensor control circuitry 104 and/or the reference data 124 obtained from one or more of the laboratories 122A, 122B of FIG. 1A. In some examples, the database 314 also stores one or more example calibration models 322 generated and/or trained by the calibration model control circuitry 106. The example database 314 of FIG. 3 is implemented by any memory, storage device and/or storage disc for storing data such as, for example, flash memory, magnetic media, optical media, solid state memory, hard drive(s), thumb drive(s), etc. Furthermore, the data stored in the example database 314 may be in any data format such as, for example, binary data, comma delimited data, tab delimited data, structured query language (SQL) structures, etc. While, in the illustrated example, the example database 314 is illustrated as a single device, the example database 314 and/or any other data storage devices described herein may be implemented by any number and/or type(s) of memories.

In the illustrated example of FIG. 3, the data interface circuitry 302 receives and/or otherwise obtains the spectra 126 and/or the reference data 124 for use in generating the calibration models 322. For example, the data interface circuitry 302 receives the spectra 126 from the sensor control circuitry 104 via the network 107 of FIG. 1A, where the spectra 126 is associated with the physical samples 120 collected by the sampling system 110 of FIG. 1A. Furthermore, the data interface circuitry 302 receives the reference data 124 from the laboratories 122A, 122B of FIG. 1 via the network 107.

In this example, the reference data 124 includes actual (e.g., measured) characteristics of the physical samples 120. The actual characteristics can include, for example, one or more constituent types in the physical samples 120, quantities and/or proportions of the one or more constituent types, moisture and/or protein in the physical samples 120, etc. In particular, instead of using calibration models to generate estimated characteristics, the actual characteristics are determined based on analytical results from testing of the physical samples 120. For example, an operator provides the physical samples 120 gathered by the sampling system 110 to one or more of the laboratories 112A, 112B, where a technician can perform one or more tests on the physical samples 120 to determine the actual characteristics. In some examples, the tests are based on accepted laboratory methods such as ISO 712:2009, ISO 6540:2021, etc.

In some examples, the operator of the vehicle 102 assigns a unique identifier to each of the physical samples 120, and assigns the same unique identifier to the corresponding ones of the spectra 126. The unique identifiers allow the calibration model control circuitry 106 to match and/or store the reference data 124 with the corresponding spectra 126 for use in generating and/or training the calibration models 322. In some examples, the unique identifiers indicate a crop type (e.g., corn, wheat, barley, oats, etc.) contained in the physical samples 120 from which the reference data 124 and the spectra 126 are derived. In such examples, the operator of the vehicle 102 and/or a laboratory technician performing analysis of the physical samples 120 can assign the crop type to the spectra 126 and/or the reference data 124 when the crop type is known.

In some examples, the data interface circuitry 302 implements an online portal to which a user (e.g., the operator and/or a laboratory technician) may register. In some examples, the online portal grants access to registered users to read data from and/or write data to the database 314. In some examples, the user can log into the online portal to input the reference data 124 in association with the corresponding unique identifier and/or the crop type.

In the illustrated example of FIG. 3, the initialization circuitry 304 selects one or more initial models (e.g., initial neural network models) for use in generating and/or training the calibration models 322. For example, the initialization circuitry 304 identifies, based on the unique identifier, the crop type corresponding to the reference data 124 and/or the spectra 126. In some examples, the initialization circuitry 304 selects the initial model from the database 314 that corresponds to the identified crop type. For example, in response to the initialization circuitry 304 determining that the reference data 124 and/or the spectra 126 correspond to wheat, the initialization circuitry 304 selects an existing wheat model from the database 314, where the existing wheat model was previously generated based on known wheat spectra and known wheat reference data stored in the database 314. In some examples, the initialization circuitry 304 determines that the database 314 does not include an initial model for the identified crop type. For example, in response to the identified crop type being oats, the initialization circuitry 304 may determine that there is no existing oats model in the database 314. In such an example, the initialization circuitry 304 can select an initial model for the identified crop type based on a similar crop type. In some examples, the user can indicate the similar crop type via the user interface 114. For example, the initialization circuitry 304 can select the existing wheat model as an initial model for oats in response to determining that wheat and oats are similar crop types. In some examples, in response to determining that there is no initial model for the identified crop type and/or there are no existing models for similar crop types, the initialization circuitry 304 does not select an initial model for the identified crop type. In some such examples, the initialization circuitry 304 directs the training circuitry 306 to train a new model (e.g., a new neural network model) based on the spectra 126 and the reference data 124.

The training circuitry 306 generates and/or trains one or more example calibration models 322 based on the spectra 126 and the corresponding reference data 124. For example, the training circuitry 306 generates training data including the spectra 318 and the reference data 320. In some examples, the training circuitry 306 sub-divides the training data into a training data set and a validation data set. For example, a first portion (e.g., 80%) of the training data can be used as the training data set for training the calibration model 322, and a second portion (e.g., 20%) of the training data can be used as the validation data set for validating the calibration model 322.

In some examples, the training circuitry 306 obtains the initial model identified by the initialization circuitry 304, and re-trains the initial model based on the training data set to produce the calibration model 322. For example, the training circuitry 306 correlates the spectra 126 with the corresponding reference data 124 from the training data set, and adjusts parameters of the initial model. In particular, through a comparison of the spectra 126 and the reference data 124, the training circuitry 306 adjusts the parameters such that the calibration model 322 predicts the reference data 124 from the training data set when the spectra 126 from the training data set is provided as input to the calibration model 322. In such examples, the training circuitry 306 provides the calibration model 322 to the validation circuitry 308 for validation.

Artificial intelligence (AI), including machine learning (ML), deep learning (DL), and/or other artificial machine-driven logic, enables machines (e.g., computers, logic circuits, etc.) to use a model (e.g., the calibration model(s) 322) to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations. In this example, the input data includes the spectra 126 collected by one or more sensors, and the output includes characteristics of the physical samples 120 from which the spectra 126 were obtained.

Many different types of machine learning models and/or machine learning architectures exist. In examples disclosed herein, a convolutional neural network (CNN) model is used. Using a neural network model enables the calibration model control circuitry 106 and/or the sensor control circuitry 104 to determine the one or more characteristics of the physical samples 120. In general, machine learning models/ architectures that are suitable to use in the example approaches disclosed herein will be neural network models. However, other types of machine learning models could additionally or alternatively be used.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.) Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In examples disclosed herein, ML/AI models are trained using gradient descent. However, any other training algorithm may additionally or alternatively be used. In examples disclosed herein, training is performed until a threshold amount of error is satisfied. In examples disclosed herein, training is performed at the training circuitry 306. Training is performed using hyperparameters that control how the learning is performed (e.g., a learning rate, a number of layers to be used in the machine learning model, etc.). Hyperparameters are defined to be training parameters that are determined prior to initiating the training process. In some examples re-training may be performed. Such re-training may be performed in response to the data interface circuitry 302 receiving new spectra from the vehicle 102 and/or new reference data from the laboratories 122A, 122B.

Training is performed using training data. In examples disclosed herein, the training data includes the spectra 126 collected by the sensor 108 and the reference data 124 determined using laboratory analysis of the physical samples 120. Because supervised training is used, the training data is labeled. Labeling is applied to the training data by the operator of the vehicle 102 and/or by a laboratory technician, where the labeling includes identifying a crop type of the underlying physical samples 120.

Once training is complete, the model is deployed for use as an executable construct that processes an input and provides an output based on the network of nodes and connections defined in the model. The model is stored at the database 314. The model may then be provided to the sensor control circuitry 104 of FIG. 2 to be executed by the model evaluation circuitry 212 of FIG. 2.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before evaluation of the calibration model(s) 322. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

In the illustrated example of FIG. 3, the validation circuitry 308 validates the calibration model(s) 322 generated and/or trained by the training circuitry 306. For example, the validation circuitry 308 evaluates the calibration model 322 based on the spectra 126 from the validation data set. In such examples, the validation circuitry 308 determines predicted characteristics based on the spectra 126 and the calibration model 322. In some examples, the validation circuitry 308 compares the predicted characteristics to corresponding reference characteristics of the spectra 126 from the validation data set, where the reference characteristics are from the portion of the reference data 124 in the validation data set. The validation circuitry 308 determines an average difference (e.g., a root mean square error) between predicted values for the predicted characteristics and reference values for the reference characteristics.

In some examples, the validation circuitry 308 compares the root mean square error to a validation threshold. In some examples, the validation threshold is a predetermined value that is static throughout the operation of the calibration model control circuitry 106. In some examples, the validation threshold is a dynamic value that varies with the quantity of training data that is used by the calibration model control circuitry 106. In response to the root mean square error satisfying the validation threshold (e.g., the root mean square error is less than or equal to the validation threshold), the validation circuitry 308 stores the validated calibration model 322 in the database 314. Conversely, in response to the root mean square error not satisfying the validation threshold (e.g., the root mean square error is greater than the validation threshold), the validation circuitry 308 notifies the training circuitry 306 that further training and/or re-training of the calibration model 322 is required.

In the illustrated example of FIG. 3, the uncertainty estimation circuitry 310 determines a measurement uncertainty associated with a predicted output of the trained and/or validated calibration model 322. In some examples, the uncertainty estimation circuitry 310 determines the measurement uncertainty based on a number of samples in the training data used to generate the calibration model 322. For example, the quantity corresponds to a number of the physical samples 120 used to generate the spectra 126 and/or the reference data 124. In some examples, the uncertainty estimation circuitry 310 stores the measurement uncertainty in association with the predicted output of the associated calibration model 322 in the database 314.

In the illustrated example of FIG. 3, the distribution circuitry 312 distributes and/or otherwise sends data from the database 314 to the sensor control circuitry 104 of the vehicle 102 of FIG. 1A. In some examples, the data includes one or more of the calibration models 322 and/or the measurement uncertainty associated with the predicted outputs of calibration models 322. In some examples, the distribution circuitry 312 provides the calibration models 322 in response to a request received by the data interface circuitry 302 from the sensor control circuitry 104. In other examples, the distribution circuitry 312 sends the calibration models 322 periodically and/or in response to an update to one or more of the calibration models 322.

In some examples, the calibration model control circuitry 106 includes means for obtaining data. For example, the means for obtaining data may be implemented by the data interface circuitry 302. In some examples, the data interface circuitry 302 may be implemented by machine executable instructions such as that implemented by at least blocks 1002, 1016 of FIG. 10 executed by processor circuitry, which may be implemented by the example processor circuitry 1212 of FIG. 12, the example processor circuitry 1300 of FIG. 13, and/or the example Field Programmable Gate Array (FPGA) circuitry 1400 of FIG. 14. In other examples, the data interface circuitry 302 is implemented by other hardware logic circuitry, hardware implemented state machines, and/or any other combination of hardware, software, and/or firmware. For example, the data interface circuitry 302 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the calibration model control circuitry 106 includes means for initializing. For example, the means for initializing may be implemented by the initialization circuitry 304. In some examples, the initialization circuitry 304 may be implemented by machine executable instructions such as that implemented by at least block 1006 of FIG. 10 executed by processor circuitry, which may be implemented by the example processor circuitry 1212 of FIG. 12, the example processor circuitry 1300 of FIG. 13, and/or the example Field Programmable Gate Array (FPGA) circuitry 1400 of FIG. 14. In other examples, the initialization circuitry 304 is implemented by other hardware logic circuitry, hardware implemented state machines, and/or any other combination of hardware, software, and/or firmware. For example, the initialization circuitry 304 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the calibration model control circuitry 106 includes means for training. For example, the means for training may be implemented by the training circuitry 306. In some examples, the training circuitry 306 may be implemented by machine executable instructions such as that implemented by at least blocks 1004, 1008 of FIG. 10 executed by processor circuitry, which may be implemented by the example processor circuitry 1212 of FIG. 12, the example processor circuitry 1300 of FIG. 13, and/or the example Field Programmable Gate Array (FPGA) circuitry 1400 of FIG. 14. In other examples, the training circuitry 306 is implemented by other hardware logic circuitry, hardware implemented state machines, and/or any other combination of hardware, software, and/or firmware. For example, the training circuitry 306 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the calibration model control circuitry 106 includes means for validating. For example, the means for validating may be implemented by the validation circuitry 308. In some examples, the validation circuitry 308 may be implemented by machine executable instructions such as that implemented by at least blocks 1010, 1012, 1014 of FIG. 10 executed by processor circuitry, which may be implemented by the example processor circuitry 1212 of FIG. 12, the example processor circuitry 1300 of FIG. 13, and/or the example Field Programmable Gate Array (FPGA) circuitry 1400 of FIG. 14. In other examples, the validation circuitry 308 is implemented by other hardware logic circuitry, hardware implemented state machines, and/or any other combination of hardware, software, and/or firmware. For example, the validation circuitry 308 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the calibration model control circuitry 106 includes means for estimating uncertainty. For example, the means for estimating uncertainty may be implemented by the uncertainty estimation circuitry 310. In some examples, the uncertainty estimation circuitry 310 may be implemented by machine executable instructions such as that implemented by at least block 1018 of FIG. 10 executed by processor circuitry, which may be implemented by the example processor circuitry 1212 of FIG. 12, the example processor circuitry 1300 of FIG. 13, and/or the example Field Programmable Gate Array (FPGA) circuitry 1400 of FIG. 14. In other examples, the uncertainty estimation circuitry 310 is implemented by other hardware logic circuitry, hardware implemented state machines, and/or any other combination of hardware, software, and/or firmware. For example, the uncertainty estimation circuitry 310 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the calibration model control circuitry 106 includes means for distributing. For example, the means for distributing may be implemented by the distribution circuitry 312. In some examples, the distribution circuitry 312 may be implemented by machine executable instructions such as that implemented by at least block 1020 of FIG. 10 executed by processor circuitry, which may be implemented by the example processor circuitry 1212 of FIG. 12, the example processor circuitry 1300 of FIG. 13, and/or the example Field Programmable Gate Array (FPGA) circuitry 1400 of FIG. 14. In other examples, the distribution circuitry 312 is implemented by other hardware logic circuitry, hardware implemented state machines, and/or any other combination of hardware, software, and/or firmware. For example, the distribution circuitry 312 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the calibration model control circuitry 106 of FIG. 1 is illustrated in FIG. 3, one or more of the elements, processes, and/or devices illustrated in FIG. 3 may be combined, divided, re-arranged, omitted, eliminated, and/or implemented in any other way. Further, the example data interface circuitry 302, the example initialization circuitry 304, the example training circuitry 306, the example validation circuitry 308, the example uncertainty estimation circuitry 310, the example distribution circuitry 312, the example database 314, and/or, more generally, the example calibration model control circuitry 106 of FIG. 3, may be implemented by hardware, software, firmware, and/or any combination of hardware, software, and/or firmware. Thus, for example, any of the example data interface circuitry 302, the example initialization circuitry 304, the example training circuitry 306, the example validation circuitry 308, the example uncertainty estimation circuitry 310, the example distribution circuitry 312, the example database 314, and/or, more generally, the example calibration model control circuitry 106, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device (s) (FPLD(s)) such as Field Programmable Gate Arrays (FPGAs). When reading any of the apparatus or system claims of this patent to cover a purely software and/or firmware implementation, at least one of the example data interface circuitry 302, the example initialization circuitry 304, the example training circuitry 306, the example validation circuitry 308, the example uncertainty estimation circuitry 310, the example distribution circuitry 312, and/or the example database 314 is/are hereby expressly defined to include a non-transitory computer readable storage device or storage disk such as a memory, a digital versatile disk (DVD), a compact disk (CD), a Blu-ray disk, etc., including the software and/or firmware. Further still, the example calibration model control circuitry 106 of FIG. 1 may include one or more elements, processes, and/or devices in addition to, or instead of, those illustrated in FIG. 3, and/or may include more than one of any or all of the illustrated elements, processes and devices.

Figure 4:
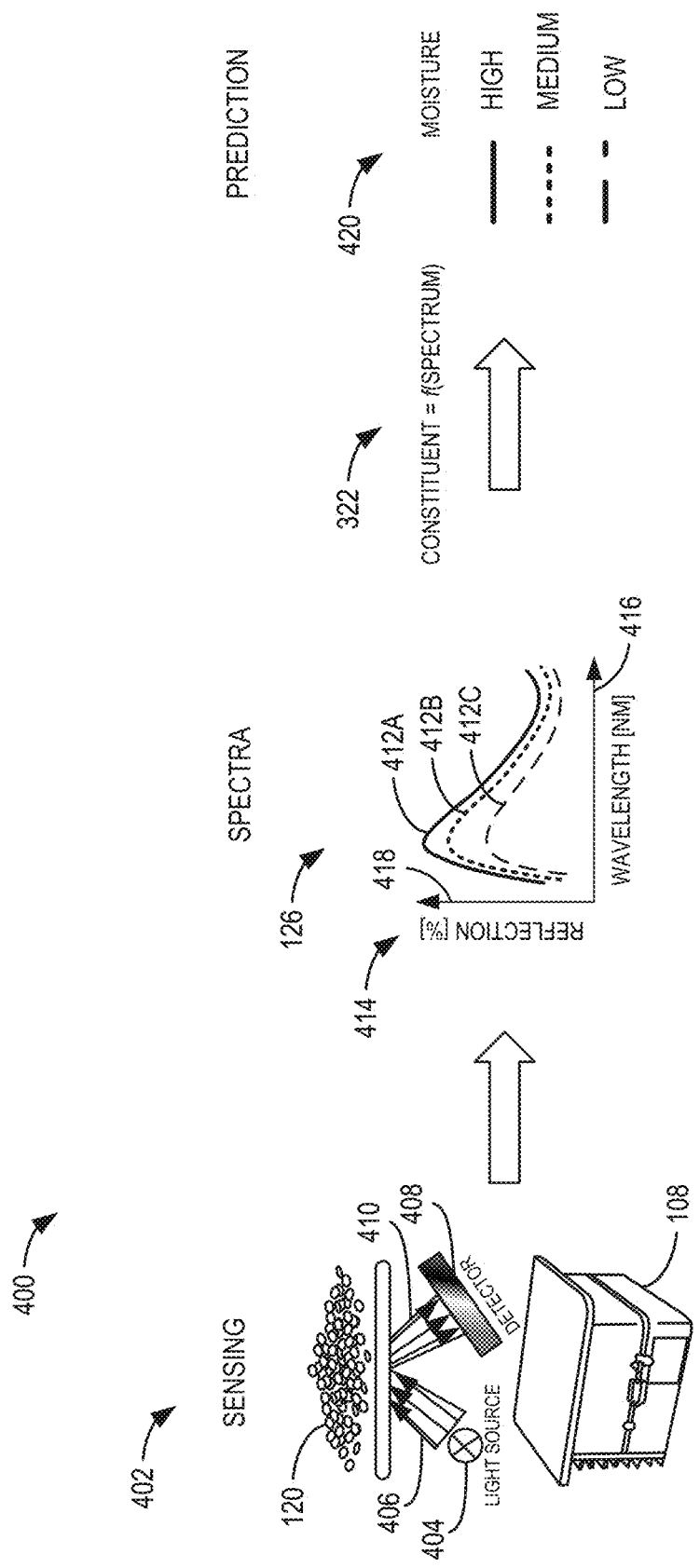
FIG. 4 is a first example process flow diagram illustrating a first example process flow for predicting characteristics of physical samples based on spectra from the physical samples.

FIG. 4 is a first example process flow diagram 400 illustrating a first example process flow for predicting characteristics of the physical samples 120 based on spectra 126 from the physical samples 120. The first process flow of FIG. 4 may be executed by the sensor control circuitry 104 of FIGS. 1A and/or 2. In the illustrated example of FIG. 4, at example sensing 402, an example light source 404 emits light 406 toward the physical samples 120, and an example detector 408 detects reflected light 410 reflected from the physical samples 120. The sensor interface circuitry 202 of the sensor control circuitry 104 of FIGS. 1A and/or 2 generates the spectra 126 based on the reflected light 410. In the illustrated example of FIG. 4, the spectra 126 include a first example spectral signal 412A, a second example spectral signal 412B, and a third example spectral signal 412C. In this example, the spectral signals 412A, 412B, 412C are plotted on an example graph 414 representing wavelength (in nanometers (nm)) on an example horizontal axis 416 and reflection (as a percentage) on an example vertical axis 418. For example, the example graph 414 indicates, for a given wavelength, a percentage of the emitted light 406 that is reflected from the physical samples 120.

In the illustrated example of FIG. 4, the spectral signals 412A, 412B, 412C are provided as input to the calibration model(s) 322. For example, the model evaluation circuitry 212 of FIG. 2 evaluates the spectral signals 412A, 412B, 412C using the calibration model(s) 322 to generate example predictions 420 for one or more constituents of the physical samples 120. In this example, the predictions 420 indicate moisture of the physical samples 120. For example, the first spectral signal 412A corresponds to a high moisture level, the second spectral signal 412B corresponds to a medium moisture level, and the third spectral signal 412C corresponds to a low moisture level. In some examples, the vehicle 102 of FIG. 1 can perform one or more operations based on the predictions 420. For example, in response to determining that the physical samples 120 from one or more locations in a field have low moisture levels, the operator of the vehicle 102 may determine that the one or more locations are to be watered.

Figure 5:
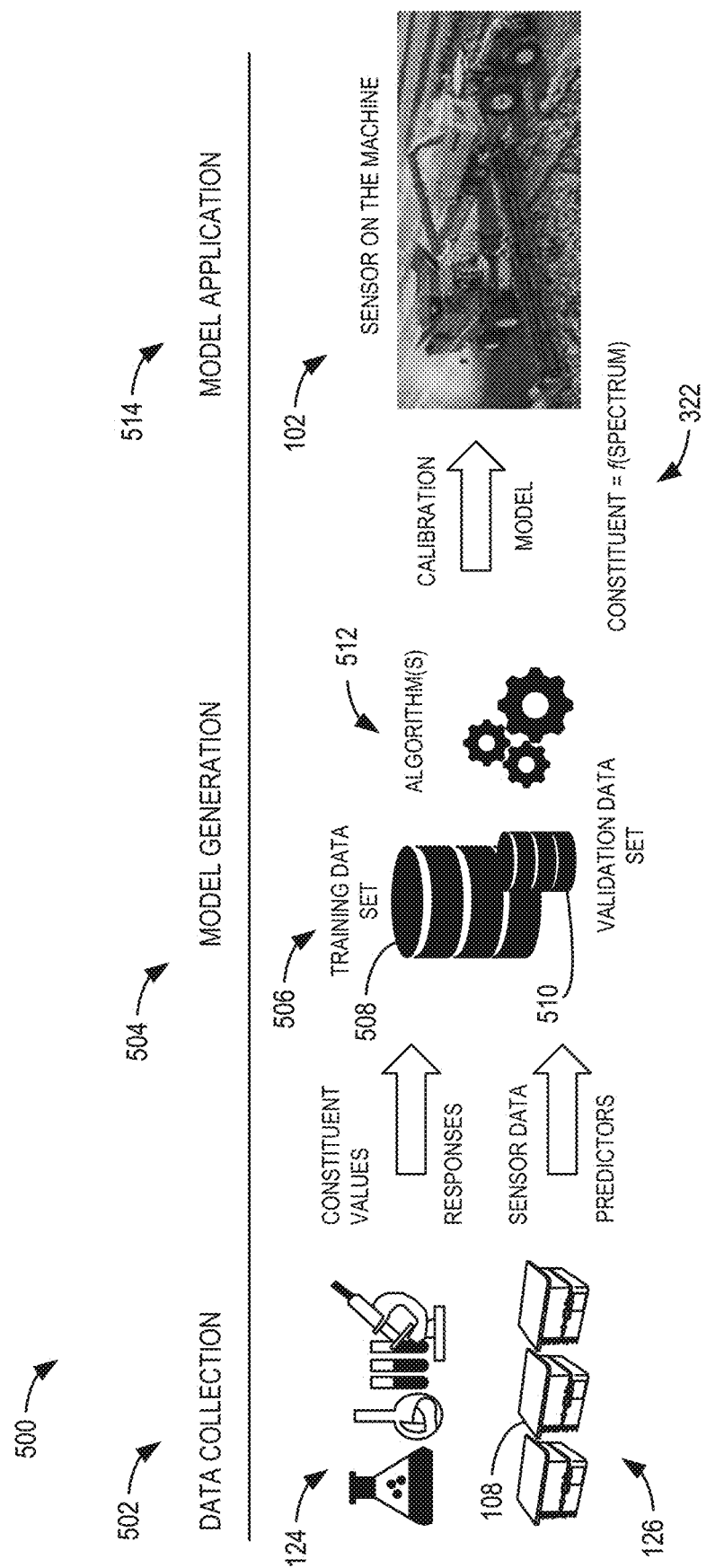
FIG. 5 is a second example process flow diagram illustrating a second example process flow for generating a calibration model.

FIG. 5 is a second example process flow diagram 500 illustrating a second example process flow. The second process flow of FIG. 5 may be executed by the calibration model control circuitry 106 of FIGS. 1A and/or 3. In the illustrated example of FIG. 5, at example data collection 502, the data interface circuitry 302 of FIG. 3 obtains the reference data 124 and the spectra 126. For example, the reference data 124 results from laboratory analysis of the physical samples 120 of FIGS. 1A and/or 4 by one or more of the laboratories 122A, 122B of FIG. 1A, and the spectra 126 results from optical measurements by one or more of the sensors 108. In this example, sensor data refers to the spectra 126 that may be used as predictors for training the calibration model(s) 322. Furthermore, the reference data 124 includes reference (e.g., measured) constituent values corresponding to the spectra 126.

In the illustrated example, at example model generation 504, the calibration model control circuitry 106 generates the calibration model(s) 322 based on example learning data 506. In this example, the learning data 506 is sub-divided into an example training data set 508 and an example validation data set 510. In some examples, the training circuitry 306 of FIG. 3 trains the calibration model(s) 322 by comparing the spectra 126 in the training data set 508 to the corresponding constituent values in the training data set 508, and adjusting one or more parameters of the calibration model 322 such that the calibration model 322 predicts the constituent values in response to the spectra 126 being input into the calibration model 322. In this example, the training circuitry 306 trains the calibration model 322 based on one or more example machine learning algorithms 512 including, for example, gradient descent.

In the illustrated example of FIG. 5, the validation circuitry 308 of FIG. 3 validates the trained calibration model 322 based on the validation data set 510. For example, the validation circuitry 308 evaluates the calibration model 322 based on the spectra 126 from the validation data set 510, such that the validation circuitry 308 determines predicted constituent values based on the calibration model 322. The validation circuitry 308 compares the predicted constituent values to the reference constituent values from the reference data 124 in the validation data set 510, and determines a root mean square error between the predicted and reference constituent values. In response to the root mean square error satisfying a validation threshold, the distribution circuitry 312 of FIG. 3 deploys the validated calibration model 322 in the sensor control circuitry 104 of FIGS. 1A and/or 2. Conversely, in response to the proportion not satisfying the validation threshold, the validation circuitry 308 directs the training circuitry 306 to further train and/or re-train the calibration model 322.

In the illustrated example of FIG. 5, at example model application 514, the vehicle 102 receives the calibration model 322 via the sensor control circuitry 104 implemented on the vehicle 102. In some examples, the calibration model 322 is stored in the sensor data database 208 and/or can be evaluated by the model evaluation circuitry 212 of FIG. 2. In some examples, when the vehicle 102 traverses a field (e.g., a work area), the sampling system 110 of the vehicle 102 can collect one or more new physical samples, and the sensor 108 of the vehicle 102 gathers new spectra associated with the one or more new physical samples. In some such examples, the model evaluation circuitry 212 evaluates the calibration model 322 based on the new spectra to estimate the physical characteristics (e.g., one or more constituent materials, quantities of the one or more constituent materials, etc.) of the new physical samples. In such examples, the sensor control circuitry 104 can determine the physical characteristics of soil in the field without separate laboratory testing of the soil.

Figure 6:
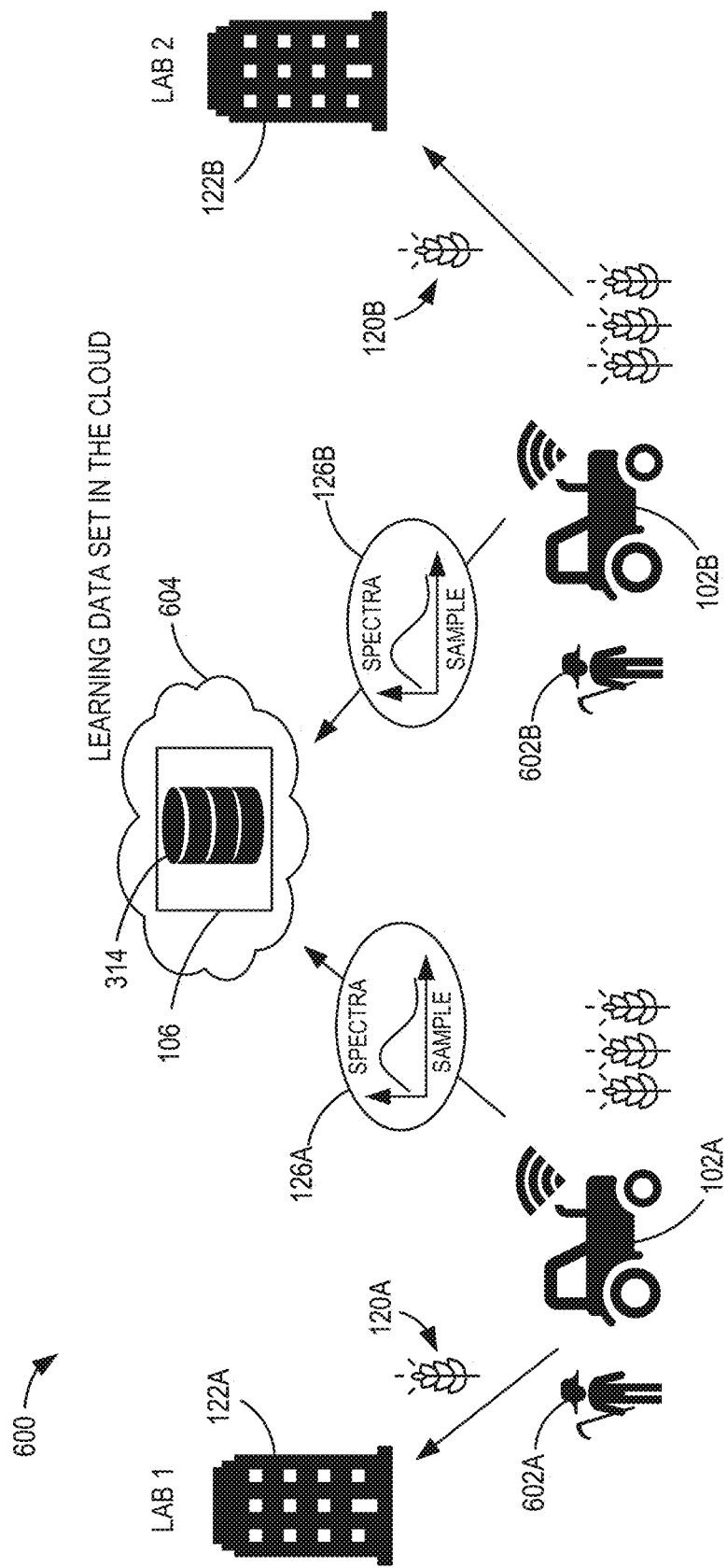
FIG. 6 is a third example process flow diagram illustrating an example sample collection process.

FIG. 6 is a third example process flow diagram 600 illustrating an example sample collection process. In the illustrated example of FIG. 6, first and second operators 602A, 602B operate respective ones of the vehicles 102A, 102B. In some examples, the sampling system 110 of the first vehicle 102A collects a first physical sample 120A from a first location, and the sampling system 110 of the second vehicle 102B collects a second physical sample 120B from a second location. In this example, the first and second physical samples 120B correspond to the same crop type (e.g., wheat, corn, barley, etc.). In other examples, a first crop type of the first physical sample 120A can be different from a second crop type of the second physical sample 120B. In some examples, the first and second locations are in the same field (e.g., work area) or different fields. In the illustrated example of FIG. 6, the sensor 108 of the first vehicle 102A gathers a first spectral sample 126A from the first physical sample 120A. For example, the light source 404 of FIG. 4 emits light toward the first physical sample 120A, and the detector 408 of the sensor 108 of FIG. 4 detects the light reflected from the first physical sample 120A to produce the first spectral sample 126A. Similarly, in this example, the sensor 108 of the second vehicle 102B gathers a second spectral sample 126B from the second physical sample 120B.

In the illustrated example of FIG. 6, the first operator 602A provides the first physical sample 120A to the first laboratory 122A, and the second operator 602B provides the second physical sample 120B to the second laboratory 122B. In other examples, the first and second operators 602A, 602B can provide the first and second physical samples 120A, 120B to the same laboratory (e.g., one of the first laboratory 122A or the second laboratory 122B). Furthermore, the sensor control circuitry 104A of the first vehicle 102A provides the first spectral sample 126A to the calibration model control circuitry 106 implemented in an example cloud environment 604, and the sensor control circuitry 104B of the second vehicle 102B provides the second spectral sample 126B to the calibration model control circuitry 106. In this example, the first and second spectral samples 126A, 126B are stored in the database 314 of the calibration model control circuitry 106 of FIG. 3.

Figure 7:
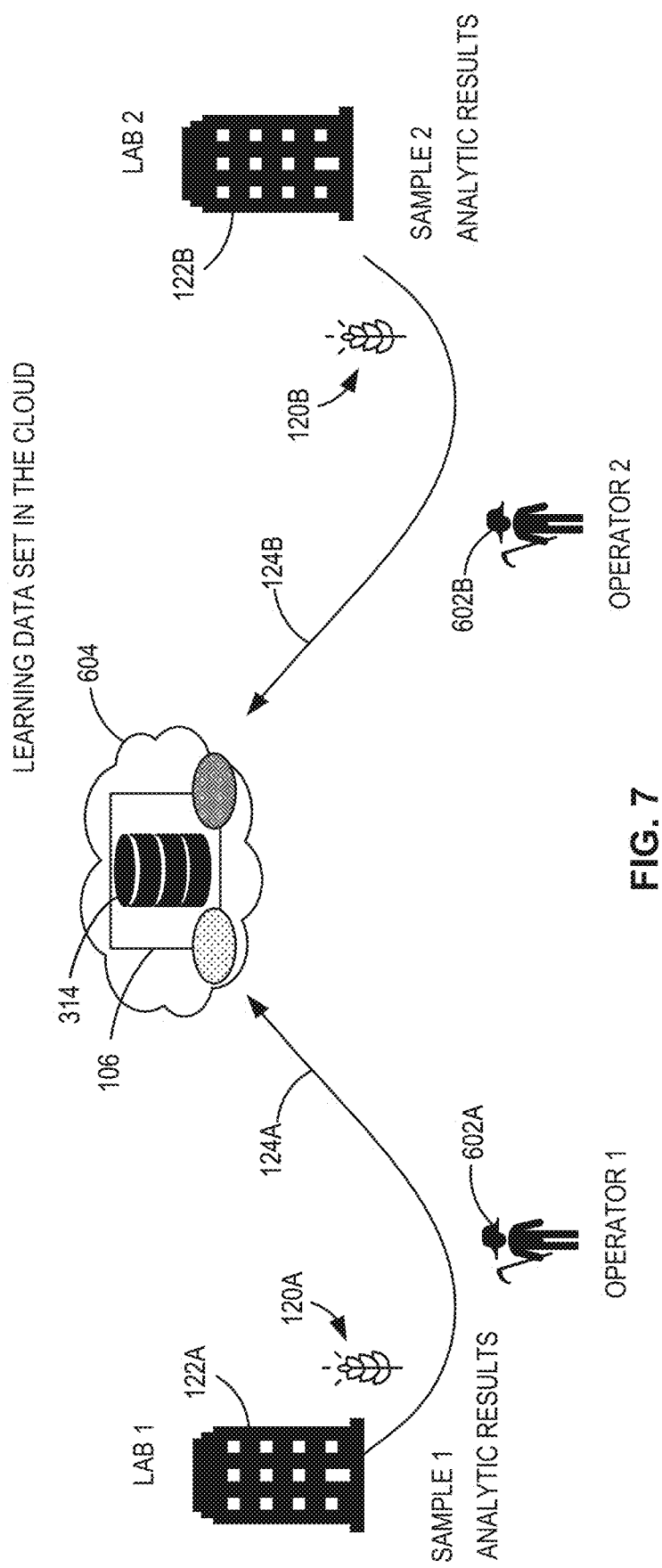
FIG. 7 is a fourth example process flow diagram illustrating an example reference data generation process.

FIG. 7 is a fourth example process flow diagram 700 illustrating an example reference data generation process. In the illustrated example of FIG. 7, the first laboratory 122A performs analytical testing of the first physical sample 120A to determine physical characteristics thereof. For example, results of the analytical testing can include one or more constituent materials (e.g., moisture, protein, etc.) in the first physical sample 120A, quantities and/or proportion of the one or more constituent materials, temperature, and/or pH value of the first physical sample 120A.

In this example, the first laboratory 122A provides the analytic results associated with the first physical sample 120A as first reference data 124A to the calibration model control circuitry 106 implemented the cloud environment 604. In some examples, the first laboratory 122A provides the first reference data 124A via an online portal. For example, a laboratory technician of the first laboratory 122A registers an account with the database 314 of the calibration model control circuitry 106 of FIG. 3, where the registration enables the laboratory technician to write data to and/or read data from the database 314. In other examples, the first laboratory 122A provides the first reference data 124A to the first operator 602A, and the first operator 602A logs into the registered account to input the first reference data 124A into the database 314. Similarly, the second laboratory 122B performs analytical testing of the second physical sample 120 to produce the second reference data 124B, and the second laboratory 122B and/or the second operator 602B provides the second reference data 124B to the database 314.

Figure 8:
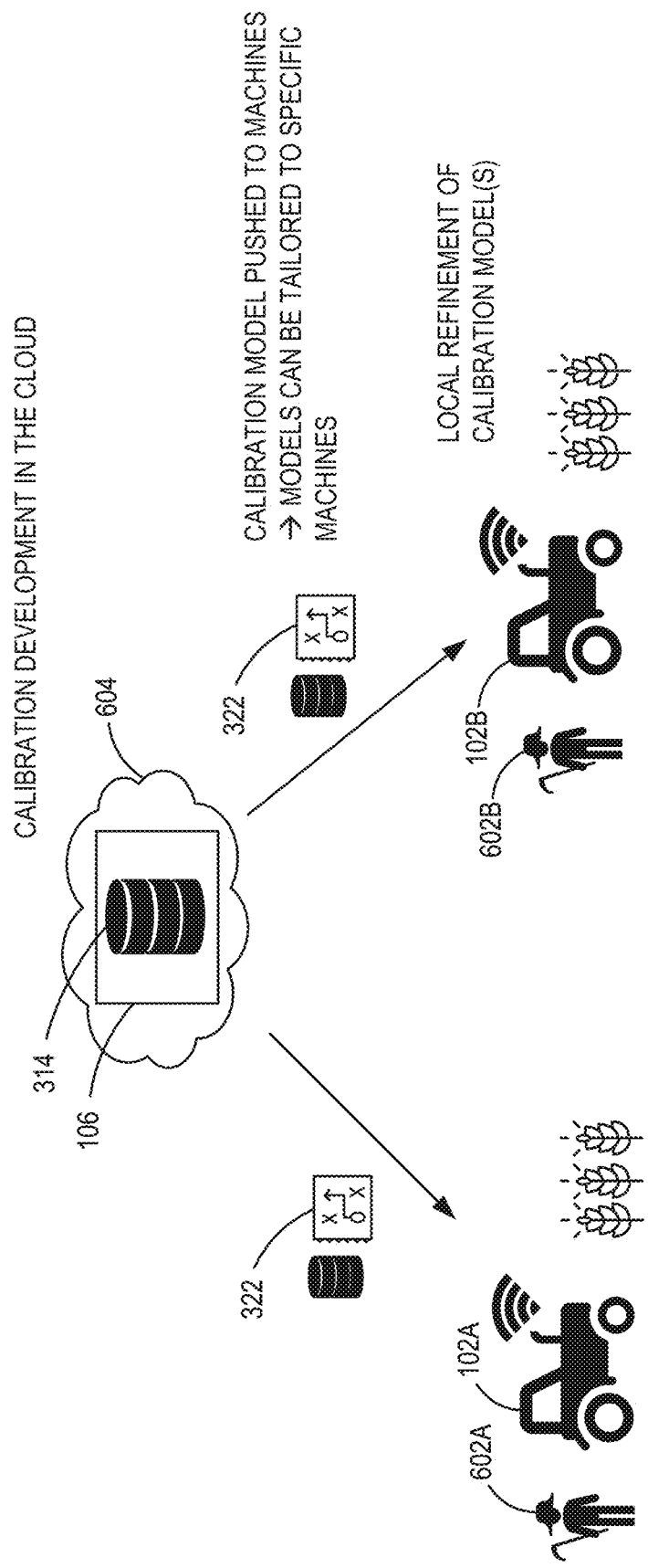
FIG. 8 is a fifth example process flow diagram illustrating an example calibration model development process.

FIG. 8 is a fifth example process flow diagram 800 illustrating an example calibration model development process. In the illustrated example of FIG. 8, the calibration model control circuitry 106 generates and/or trains the calibration model(s) 322 based on data stored in the database 314. For example, the calibration model control circuitry 106 trains the calibration model(s) 322 based on the first spectral samples 126A and the first reference data 124A from the first vehicle 102A, and further based on the second spectral samples 126B and the second reference data 124B from the second vehicle 102B of FIGS. 6 and/or 7.

In some examples, the calibration model control circuitry 106 can further refine the calibration model(s) 322 for each of the respective vehicles 102A, 102B. For example, the calibration model control circuitry 106 can further train the calibration model(s) 322 based on first data 802A from the first vehicle 102A (e.g., the first spectral samples 126A and the first reference data 124A), and provides the refined calibration model(s) 322 to the first vehicle 102A. Additionally or alternatively, in some examples, the calibration model control circuitry 106 can further train the calibration model(s) 322 based on second data 802B from the second vehicle 102B (e.g., the second spectral samples 126B and the second reference data 124B), and provides the refined calibration model(s) 322 to the second vehicle 102B. In some examples, refinement and/or tailoring of the calibration model(s) 322 to the sensor 108 specific to each vehicle 102A, 102B reduces error of predictions that are determined using the calibration model(s) 322.

Figure 9:
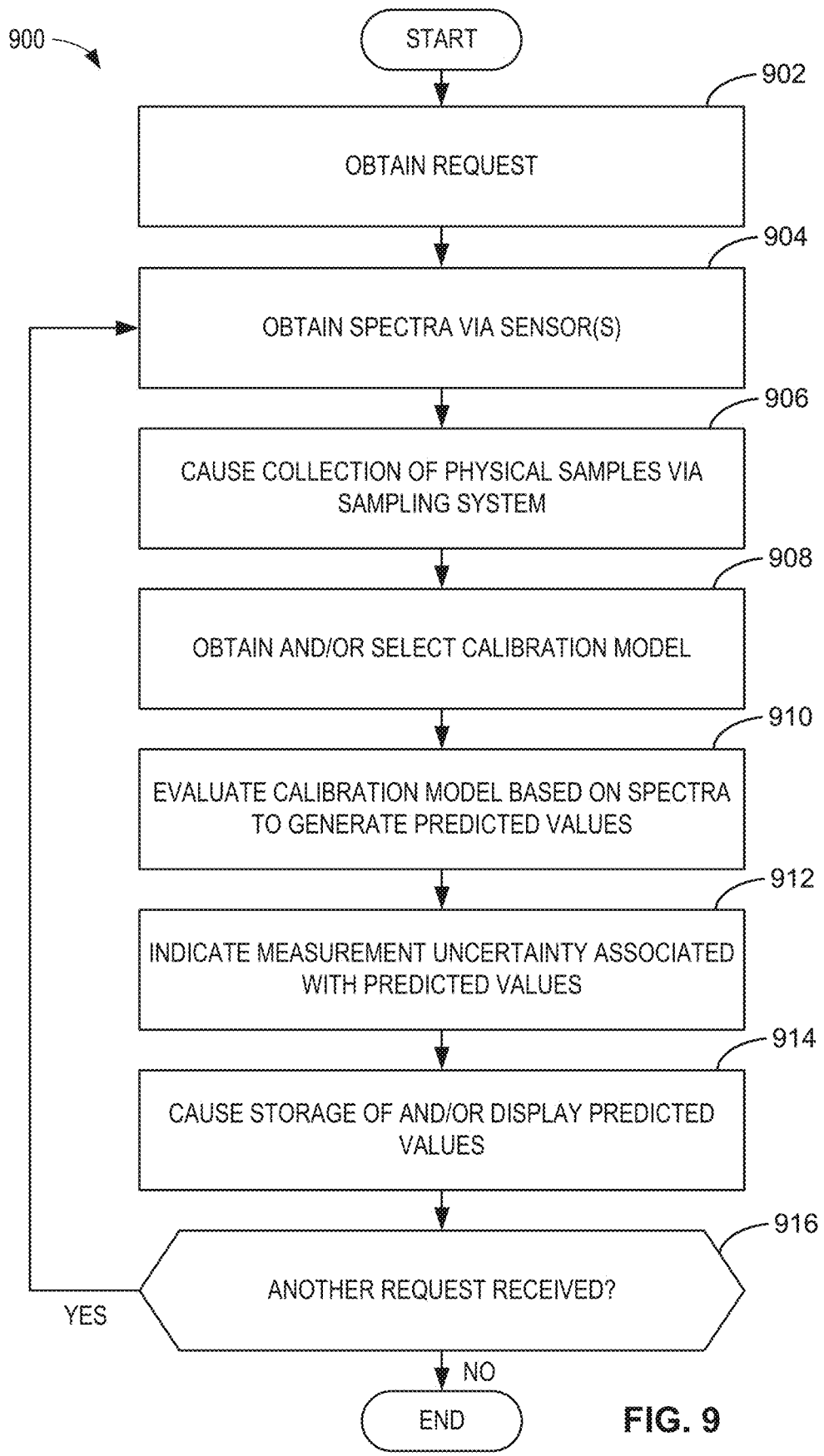
FIG. 9 is a flowchart representative of example machine readable instructions that may be executed by example processor circuitry to implement the sensor control circuitry of FIG. 2.

A flowchart representative of example hardware logic circuitry, machine readable instructions, hardware implemented state machines, and/or any combination thereof for implementing the sensor control circuitry 104 of FIG. 2 is shown in FIG. 9. The machine readable instructions may be one or more executable programs or portion(s) of an executable program for execution by processor circuitry, such as the processor circuitry 1112 shown in the example processor platform 1100 discussed below in connection with FIG. 11 and/or the example processor circuitry discussed below in connection with FIGS. 13 and/or 14. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)

gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 9, many other methods of implementing the example sensor control circuitry 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 9 and/or 10 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 9 is a flowchart representative of example machine readable instructions and/or example operations 900 that may be executed and/or instantiated by the example sensor control circuitry 104 of FIGS. 1A and/or 2 to gather and/or evaluate spectral data. The machine readable instructions and/or operations 900 of FIG. 9 begin at block 902, at which the example sensor control circuitry 104 obtains a request. For example, the example user interface control circuitry 206 obtains the request from an operator of the vehicle 102 of FIG. 1 via the user interface 114 of FIGS. 1A and/or 2. In some examples, the request includes one or more locations at which spectral and/or physical samples is/are to be collected.

At block 904, the example sensor control circuitry 104 obtains the spectra 126 via the sensor 108 of FIG. 1A. For example, the example sensor interface circuitry 202 of FIG. 2 directs the light source 404 to emit light towards the physical sample 120, and the detector 408 of the sensor 108 detects the light reflected from the physical sample 120 to generate the spectra 126 based on the reflected light. In some examples, the sensor interface circuitry 202 receives the spectra 126 from the sensor 108 and causes storage of the spectra 126 in the sensor data database 208 of FIG. 2.

At block 906, the example sensor control circuitry 104 causes the example sampling system 110 of FIGS. 1A and/or 2 to collect the physical sample 120. For example, the example sampling interface circuitry 204 of FIG. 2 directs the sampling system 110 to collect the physical sample 120 and/or cause storage of the physical sample 120. In some examples, the physical sample 120 can be stored in a container that may be retrieved at a later time by the operator of the vehicle 102.

At block 908, the example sensor control circuitry 104 obtains and/or selects one or more of the example calibration models 322. For example, the example model selection circuitry 210 selects the calibration model 322 corresponding to a crop type of the field traversed by the vehicle 102, where the model selection circuitry 210 determines the crop type from the request input by the operator of the vehicle 102. In some examples, the model selection circuitry 210 selects the calibration model 322 based on a desired physical characteristic to be determined for the physical sample 120, where the request from the user interface 114 indicates the desired physical characteristic. For example, the model selection circuitry 210 selects a first one of the calibration models 322 when the desired characteristic is, for example, a moisture level of the physical sample 120, and selects a second one of the calibration models 322 when the desired characteristic is, for example, a pH level of the physical sample 120. In some examples, the example model adaptation circuitry 214 adapts and/or refines the selected calibration model 322 for the particular sensor 108 of the vehicle 102.

At block 910, the sensor control circuitry 104 evaluates the calibration model 322 based on the spectra 126 from the sensor 108. For example, the model evaluation circuitry 212 evaluates the calibration model 322 based on the spectra 126 to determine predicted values for the one or more desired characteristics associated with the physical sample 120. In some examples, the predicted values correspond to predicted constituent materials of the physical sample 120, quantities and/or proportions of the constituent materials, moisture level in the physical sample 120, pH level of the physical sample 120, temperature, etc.

At block 912, the sensor control circuitry 104 indicates a measurement uncertainty associated with the calibration model 322. For example, the example user interface control circuitry 206 determines the measurement uncertainty associated with the predicted values output by the calibration model 322, and the user interface control circuitry 206 causes a display of the user interface 114 to display the measurement uncertainty to the operator of the vehicle 102. In some examples, the user interface control circuitry 206 causes one or more light indicators on the user interface 114 to be illuminated based on the measurement uncertainty. For example, the user interface control circuitry 206 turns on a first one of the light indicators (e.g., a green light indicator) when the measurement uncertainty is low, a second one of the light indicators (e.g., a yellow light indicator) when the measurement uncertainty is medium, and a third one of the light indicators (e.g., a red light indicator) when the measurement uncertainty is high.

At block 914, the sensor control circuitry 104 causes storage and/or display of the predicted values. For example, the user interface control circuitry 206 causes the display of the user interface 114 to display the predicted values to the operator of the vehicle 102. Additionally or alternatively, the example model evaluation circuitry 212 provides the predicted values to the sensor data database 208 of FIG. 2 for storage therein.

At block 916, the sensor control circuitry 104 determines whether another request is received. For example, the user interface control circuitry 206 determines whether another request from the operator of the vehicle 102 is received via the user interface 114. In some examples, the request indicates to the user interface control circuitry 206 that one or more additional physical samples and/or additional spectra are to be collected. In response to the user interface control circuitry 206 receiving another request (e.g., block 916 returns a result of YES), control returns to block 904. Alternatively, in response to the user interface control circuitry 206 not receiving another request (e.g., block 916 returns a result of NO), control ends.

Figure 10:
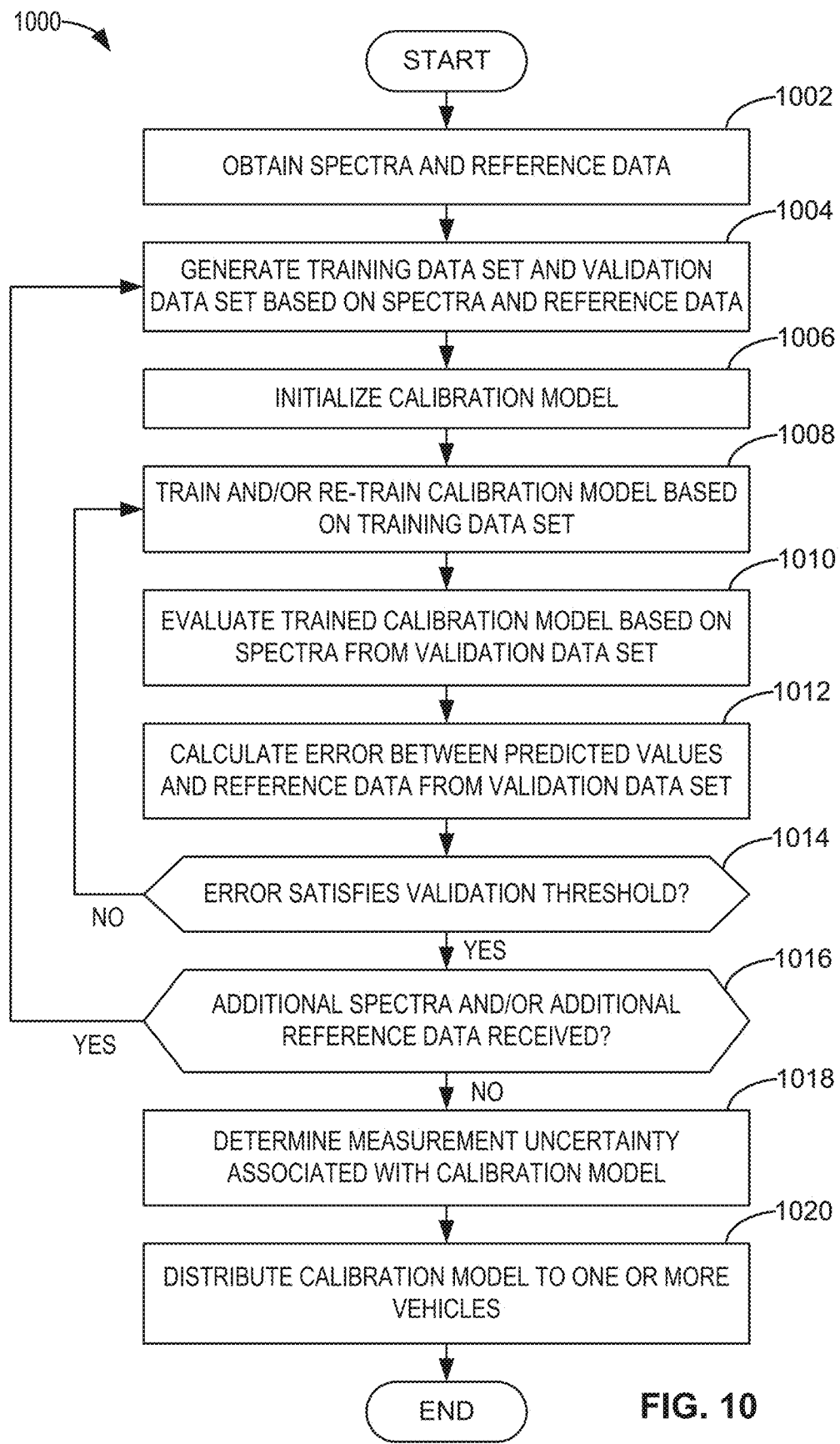
FIG. 10 is a flowchart representative of example machine readable instructions that may be executed by example processor circuitry to implement the calibration model control circuitry of FIG. 3.

A flowchart representative of example hardware logic circuitry, machine readable instructions, hardware implemented state machines, and/or any combination thereof for implementing the calibration model control circuitry 106 of FIG. 3 is shown in FIG. 10. The machine readable instructions may be one or more executable programs or portion(s) of an executable program for execution by processor circuitry, such as the processor circuitry 1212 shown in the example processor platform 1200 discussed below in connection with FIG. 12 and/or the example processor circuitry discussed below in connection with FIGS. 13 and/or 14. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 10, many other methods of implementing the example calibration model control circuitry 106 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

FIG. 10 is a flowchart representative of example machine readable instructions and/or example operations 1000 that may be executed and/or instantiated by the example calibration model control circuitry 106 of FIGS. 1A and/or 2 to generate and/or train one or more calibration models. The machine readable instructions and/or operations 1000 of FIG. 10 begin at block 1002, at which the example calibration model control circuitry 106 obtains the spectra 126 and the reference data 124 of FIG. 1A. For example, the example data interface circuitry 302 of FIG. 3 obtains the spectra 126 from the example sensor control circuitry 104 of the example vehicle 102 of FIG. 1A, and obtains the reference data 124 from an online portal in which a laboratory technician and/or an operator of the vehicle 102 can input the reference data 124.

At block 1004, the example calibration model control circuitry 106 generates the example training data set 508 and the example validation data set 510 based on the spectra 126 and the reference data 124. For example, the example initialization circuitry 304 divides the spectra 126 and the reference data 124 into a first portion corresponding to the training data set 508 and a second portion corresponding to the validation data set 510. In some examples, the first portion corresponds to 80% of the spectra 126 and the reference data 124, and the second portion corresponds to 20% of the spectra 126 and the reference data 124.

At block 1006, the example calibration model control circuitry 106 initializes the calibration model 322. For example, the example initialization circuitry 304 of FIG. 3 selects an initial model for the calibration model 322 from the example database 314 of FIG. 3. In some examples, the initialization circuitry 304 determines a crop type of the physical model 120 from which the spectra 126 and the reference data 124 were obtained, and selects the initial model corresponding to a similar crop type. In some examples, when the initialization circuitry 304 cannot determine the crop type of the physical sample 120 and/or determines that the initial models in the database 314 do not correspond to a similar crop type, the initialization circuitry 304 selects a new (e.g., untrained) neural network as the initial model for the calibration model 322.

At block 1008, the example calibration model control circuitry 106 trains and/or re-trains the calibration model 322 based on the training data set 508. For example, the example training circuitry 306 of FIG. 3 correlates the spectra 126 and the reference data 124 in the training data set 508, and adjusts one or more parameters of the calibration model 322 such that the calibration model 322 outputs the reference data 124 based on the spectra 126.

At block 1010, the calibration model control circuitry 106 evaluates the trained calibration model 322 based on the spectra 126 from the validation data set 510. For example, the example validation circuitry 308 evaluates the trained calibration model 322 based on the spectra 126 to determine predicted values for one or more physical characteristics represented in the reference data 124.

At block 1012, the calibration model control circuitry 106 calculates an error between the predicted values and the reference data 124 from the validation data set 510. For example, the validation circuitry 308 calculates the error (e.g., the root mean square error) between the predicted values and reference values from the reference data 124. Additionally or alternatively, the validation circuitry 308 determines a proportion (e.g., a percentage) of the reference data 124 in the validation data set 510 that the predicted values predict correctly.

At block 1014, the calibration model control circuitry 106 determines whether the error satisfies a validation threshold. For example, the validation circuitry 308 determines whether the error satisfies the validation threshold representing an acceptable amount of error between the predicted values and the reference values. In some examples, the validation circuitry 308 determines that the error satisfies the validation threshold when the error is less than the validation threshold, where the validation threshold can be 10%, 5%, 1%, etc. In response to the validation circuitry 308 determining that the error does not satisfy the validation threshold (e.g., block 1014 returns a result of NO), control returns to block 1008. Alternatively, in response to the validation circuitry 308 determining that the error satisfies the validation threshold (e.g., block 1014 returns a result of YES), control proceeds to block 1016.

At block 1016, the calibration model control circuitry 106 determines whether additional spectra and/or additional reference data has been received. For example, the data interface circuitry 302 may obtain additional spectra and/or additional reference data from the vehicle 102 from a different location in the field, and/or from one or more different vehicles in different locations. In response to the data interface circuitry 302 receiving additional spectra and/or additional reference data (e.g., block 1016 returns a result of YES), control returns to block 1004. Alternatively, in response to the data interface circuitry 302 not receiving additional spectra and/or additional reference data (e.g., block 1016 returns a result of NO), control proceeds to block 1018.

At block 1018, the calibration model control circuitry 106 determines a measurement uncertainty associated with the calibration model 322. For example, the example uncertainty estimation circuitry 310 determines the measurement uncertainty based on the error calculated by the validation circuitry 308. Additionally or alternatively, the uncertainty estimation circuitry 310 determines the measurement uncertainty based on a number of samples (e.g., a quantity of the spectra 126 and/or the reference data 124) used to generate the calibration model 322. For example, the measurement uncertainty decreases when the quantity of samples increases and/or the error decreases. In some examples, the uncertainty estimation circuitry 310 stores the measurement uncertainty in association with predicted values from the calibration model 322 in the database 314.

At block 1020, the calibration model control circuitry 106 distributes the calibration model to one or more of the vehicles 102A, 102B. For example, the example distribution circuitry 312 provides the calibration model 322 to the one or more of the vehicles 102A, 102B via the network 107 of FIG. 1A. In some examples, the distribution circuitry 312 provides the calibration model 322 in response to a request from the one or more of the vehicles 102A, 102B.

Figure 11:
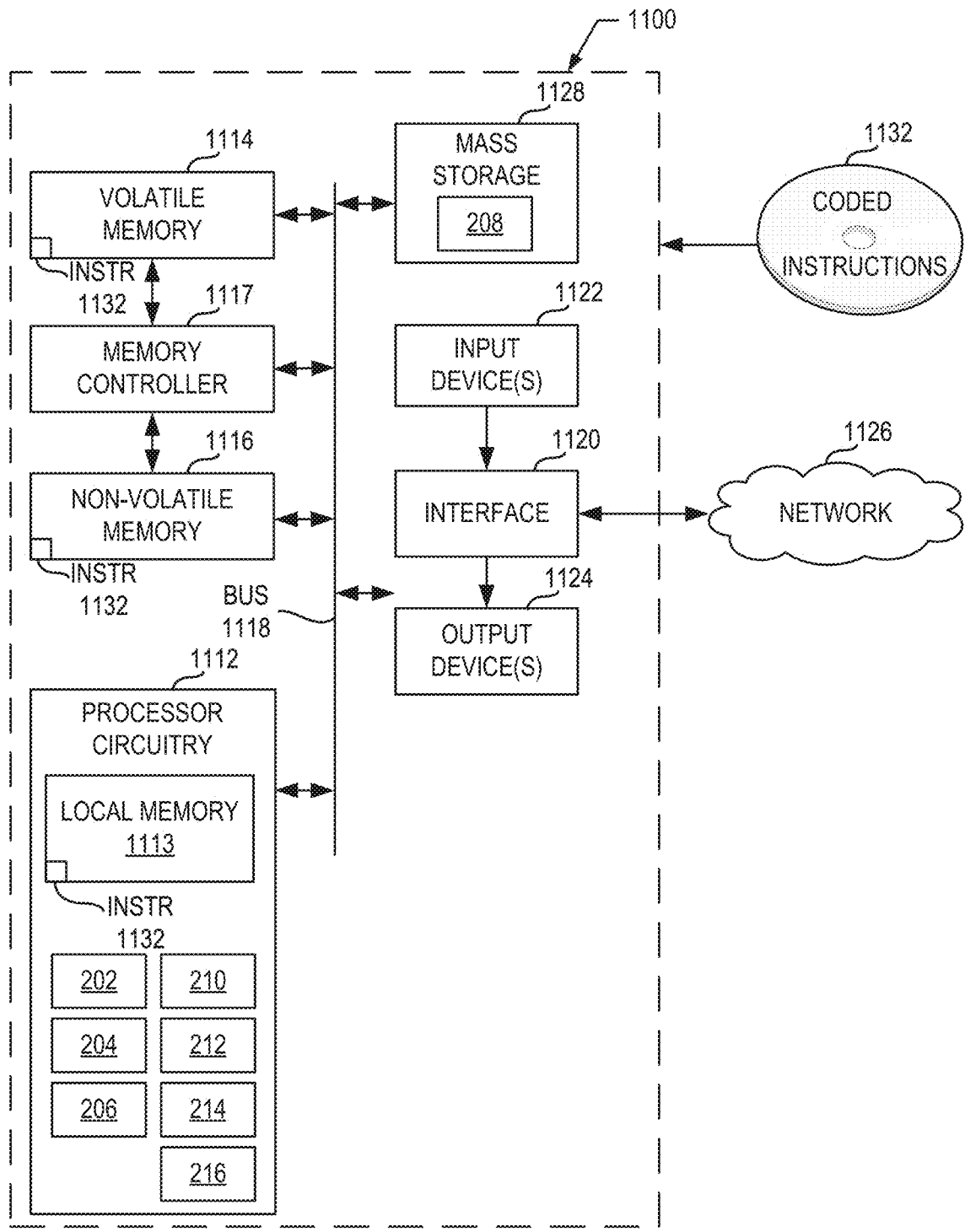
FIG. 11 is a block diagram of an example processing platform including processor circuitry structured to execute the example machine readable instructions of FIG. 9 to implement the sensor control circuitry of FIG. 2.

FIG. 11 is a block diagram of an example processor platform 1100 structured to execute and/or instantiate the machine readable instructions and/or operations of FIG. 9 to implement the sensor control circuitry 104 of FIG. 2. The processor platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1100 of the illustrated example includes processor circuitry 1112. The processor circuitry 1112 of the illustrated example is hardware. For example, the processor circuitry 1112 can be implemented by one or more integrated circuits, logic circuits, FPGAs microprocessors, CPUs, GPUs, DSPs, and/or microcontrollers from any desired family or manufacturer. The processor circuitry 1112 may be implemented by one or more semiconductor based (e.g., silicon based) devices. In this example, the processor circuitry 1112 implements the example sensor interface circuitry 202, the example sampling interface circuitry 204, the example user interface control circuitry 206, the example model selection circuitry 210, the example model evaluation circuitry 212, the example model adaptation circuitry 214, and the example network interface circuitry 216.

The processor circuitry 1112 of the illustrated example includes a local memory 1113 (e.g., a cache, registers, etc.). The processor circuitry 1112 of the illustrated example is in communication with a main memory including a volatile memory 1114 and a non-volatile memory 1116 by a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1116 may be implemented by flash memory and/or any other desired type of memory device. Access to the main memory 1114, 1116 of the illustrated example is controlled by a memory controller 1117.

The processor platform 1100 of the illustrated example also includes interface circuitry 1120. The interface circuitry 1120 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1122 are connected to the interface circuitry 1120. The input device(s) 1122 permit(s) a user to enter data and/or commands into the processor circuitry 1112. The input device(s) 1122 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1124 are also connected to the interface circuitry 1120 of the illustrated example. The output devices 1124 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1120 of the illustrated example, thus, typically includes a graphics driver card, a graphics driver chip, and/or graphics processor circuitry such as a GPU.

The interface circuitry 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1126. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1100 of the illustrated example also includes one or more mass storage devices 1128 to store software and/or data. Examples of such mass storage devices 1128 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1132, which may be implemented by the machine readable instructions of FIG. 9, may be stored in the mass storage device 1128, in the volatile memory 1114, in the non-volatile memory 1116, and/or on a removable non-transitory computer readable storage medium such as a CD or DVD.

Figure 12:
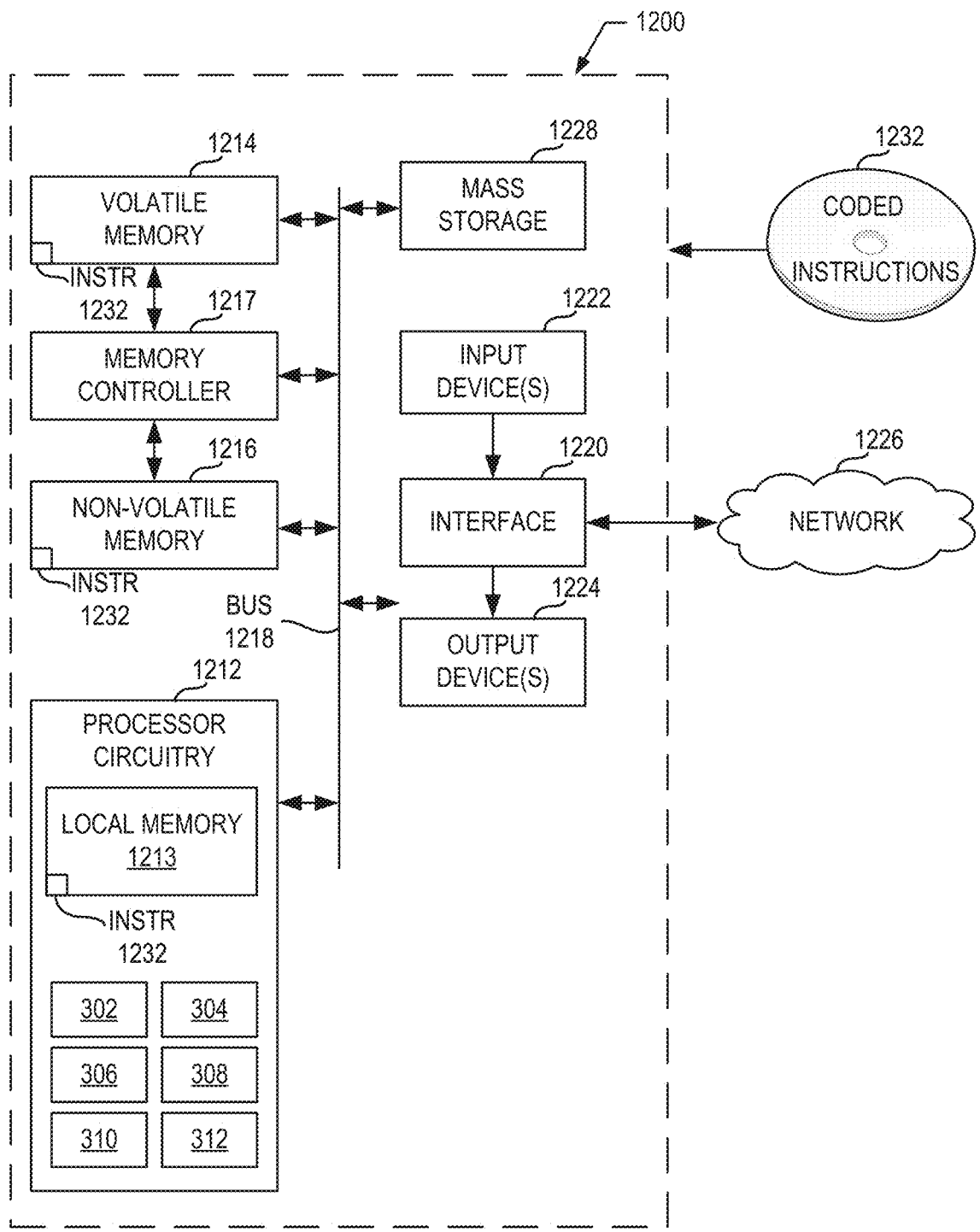
FIG. 12 is a block diagram of an example processing platform including processor circuitry structured to execute the example machine readable instructions of FIG. 10 to implement the calibration model control circuitry of FIG. 3.

FIG. 12 is a block diagram of an example processor platform 1200 structured to execute and/or instantiate the machine readable instructions and/or operations of FIG. 10 to implement the calibration model control circuitry 106 of FIG. 3. The processor platform 1200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1200 of the illustrated example includes processor circuitry 1212. The processor circuitry 1212 of the illustrated example is hardware. For example, the processor circuitry 1212 can be implemented by one or more integrated circuits, logic circuits, FPGAs microprocessors, CPUs, GPUs, DSPs, and/or microcontrollers from any desired family or manufacturer. The processor circuitry 1212 may be implemented by one or more semiconductor based (e.g., silicon based) devices. In this example, the processor circuitry 1212 implements the example data interface circuitry 302, the example initialization circuitry 304, the example training circuitry 306, the example validation circuitry 308, the example uncertainty estimation circuitry 310, and the example distribution circuitry 312.

The processor circuitry 1212 of the illustrated example includes a local memory 1213 (e.g., a cache, registers, etc.). The processor circuitry 1212 of the illustrated example is in communication with a main memory including a volatile memory 1214 and a non-volatile memory 1216 by a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1216 may be implemented by flash memory and/or any other desired type of memory device. Access to the main memory 1214, 1216 of the illustrated example is controlled by a memory controller 1217.

The processor platform 1200 of the illustrated example also includes interface circuitry 1220. The interface circuitry 1220 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1222 are connected to the interface circuitry 1220. The input device(s) 1222 permit(s) a user to enter data and/or commands into the processor circuitry 1212. The input device(s) 1222 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1224 are also connected to the interface circuitry 1220 of the illustrated example. The output devices 1224 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1220 of the illustrated example, thus, typically includes a graphics driver card, a graphics driver chip, and/or graphics processor circuitry such as a GPU.

The interface circuitry 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1226. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1200 of the illustrated example also includes one or more mass storage devices 1228 to store software and/or data. Examples of such mass storage devices 1228 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1232, which may be implemented by the machine readable instructions of FIG. 10, may be stored in the mass storage device 1228, in the volatile memory 1214, in the non-volatile memory 1216, and/or on a removable non-transitory computer readable storage medium such as a CD or DVD.

Figure 13:
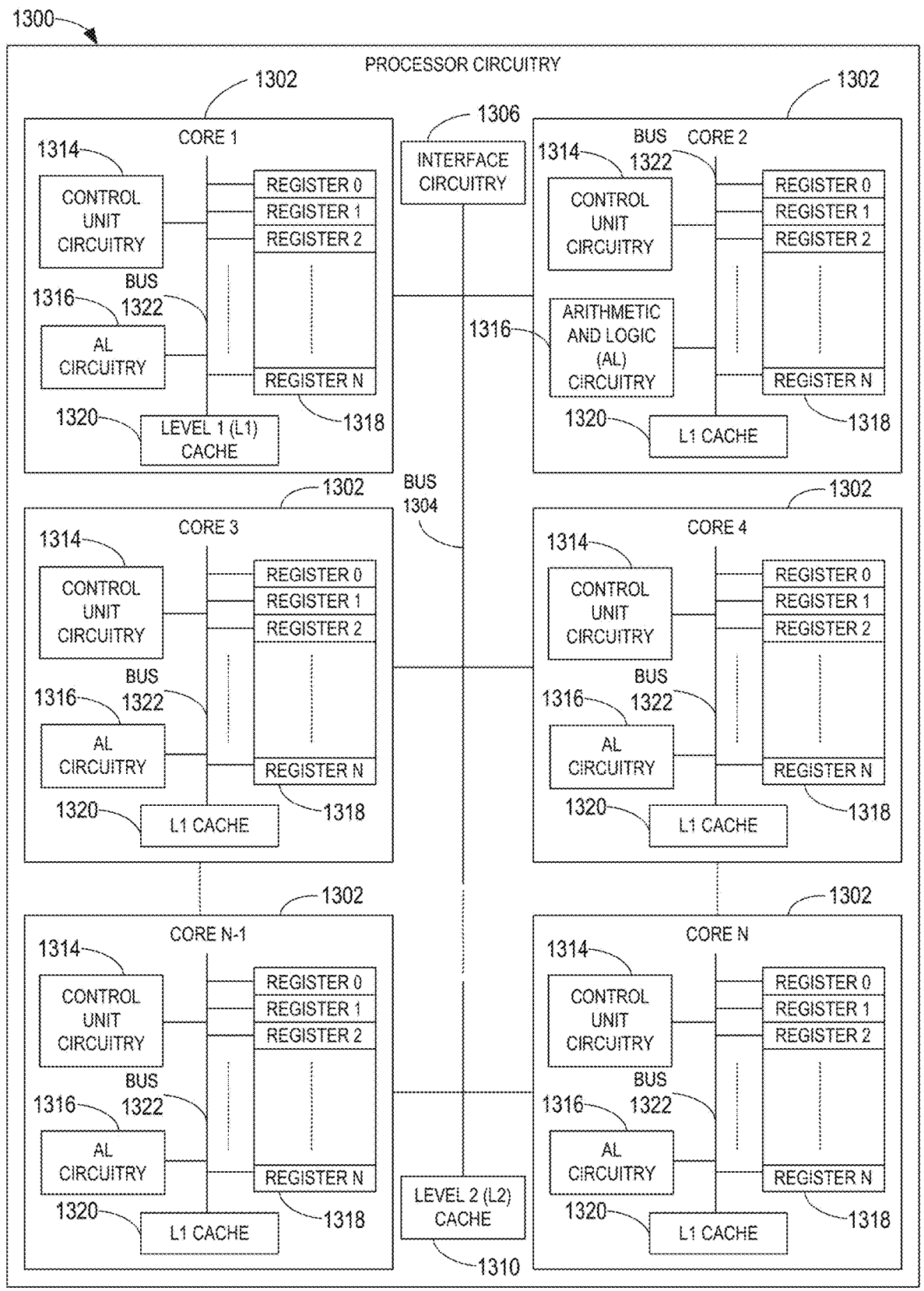
FIG. 13 is a block diagram of an example implementation of the processor circuitry of FIGS. 11 and/or 12.

FIG. 13 is a block diagram of an example implementation of the processor circuitry 1112 of FIG. 11 and/or the processor circuitry 1212 of FIG. 12. In this example, the processor circuitry 1112 of FIG. 11 and/or the processor circuitry 1212 of FIG. 12 is implemented by a microprocessor 1300. For example, the microprocessor 1300 may implement multi-core hardware circuitry such as a CPU, a DSP, a GPU, an XPU, etc. Although it may include any number of example cores 1302 (e.g., 1 core), the microprocessor 1300 of this example is a multi-core semiconductor device including N cores. The cores 1302 of the microprocessor 1300 may operate independently or may cooperate to execute machine readable instructions. For example, machine code corresponding to a firmware program, an embedded software program, or a software program may be executed by one of the cores 1302 or may be executed by multiple ones of the cores 1302 at the same or different times. In some examples, the machine code corresponding to the firmware program, the embedded software program, or the software program is split into threads and executed in parallel by two or more of the cores 1302. The software program may correspond to a portion or all of the machine readable instructions and/or operations represented by the flowcharts of FIGS. 9 and/or 10.

The cores 1302 may communicate by an example bus 1304. In some examples, the bus 1304 may implement a communication bus to effectuate communication associated with one(s) of the cores 1302. For example, the bus 1304 may implement at least one of an Inter-Integrated Circuit (I2C) bus, a Serial Peripheral Interface (SPI) bus, a PCI bus, or a PCIe bus. Additionally or alternatively, the bus 1304 may implement any other type of computing or electrical bus. The cores 1302 may obtain data, instructions, and/or signals from one or more external devices by example interface circuitry 1306. The cores 1302 may output data, instructions, and/or signals to the one or more external devices by the interface circuitry 1306. Although the cores 1302 of this example include example local memory 1320 (e.g., Level 1 (L1) cache that may be split into an L1 data cache and an L1 instruction cache), the microprocessor 1300 also includes example shared memory 1310 that may be shared by the cores (e.g., Level 2 (L2_cache)) for high-speed access to data and/or instructions. Data and/or instructions may be transferred (e.g., shared) by writing to and/or reading from the shared memory 1310. The local memory 1320 of each of the cores 1302 and the shared memory 1310 may be part of a hierarchy of storage devices including multiple levels of cache memory and the main memory (e.g., the main memory 1114, 1116 of FIG. 11 and/or the main memory 1214, 1216 of FIG. 12). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1302 may be referred to as a CPU, DSP, GPU, etc., or any other type of hardware circuitry. Each core 1302 includes control unit circuitry 1314, arithmetic and logic (AL) circuitry (sometimes referred to as an ALU) 1316, a plurality of registers 1318, the L1 cache 1320, and an example bus 1322. Other structures may be present. For example, each core 1302 may include vector unit circuitry, single instruction multiple data (SIMD) unit circuitry, load/store unit (LSU) circuitry, branch/jump unit circuitry, floating-point unit (FPU) circuitry, etc. The control unit circuitry 1314 includes semiconductor-based circuits structured to control (e.g., coordinate) data movement within the corresponding core 1302. The AL circuitry 1316 includes semiconductor-based circuits structured to perform one or more mathematic and/or logic operations on the data within the corresponding core 1302. The AL circuitry 1316 of some examples performs integer based operations. In other examples, the AL circuitry 1316 also performs floating point operations. In yet other examples, the AL circuitry 1316 may include first AL circuitry that performs integer based operations and second AL circuitry that performs floating point operations. In some examples, the AL circuitry 1316 may be referred to as an Arithmetic Logic Unit (ALU). The registers 1318 are semiconductor-based structures to store data and/or instructions such as results of one or more of the operations performed by the AL circuitry 1316 of the corresponding core 1302. For example, the registers 1318 may include vector register(s), SIMD register(s), general purpose register(s), flag register(s), segment register(s), machine specific register(s), instruction pointer register(s), control register(s), debug register(s), memory management register(s), machine check register(s), etc. The registers 1318 may be arranged in a bank as shown in FIG. 13. Alternatively, the registers 1318 may be organized in any other arrangement, format, or structure including distributed throughout the core 1302 to shorten access time. The bus 1320 may implement at least one of an I2C bus, a SPI bus, a PCI bus, or a PCIe bus.

Each core 1302 and/or, more generally, the microprocessor 1300 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1300 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 14:
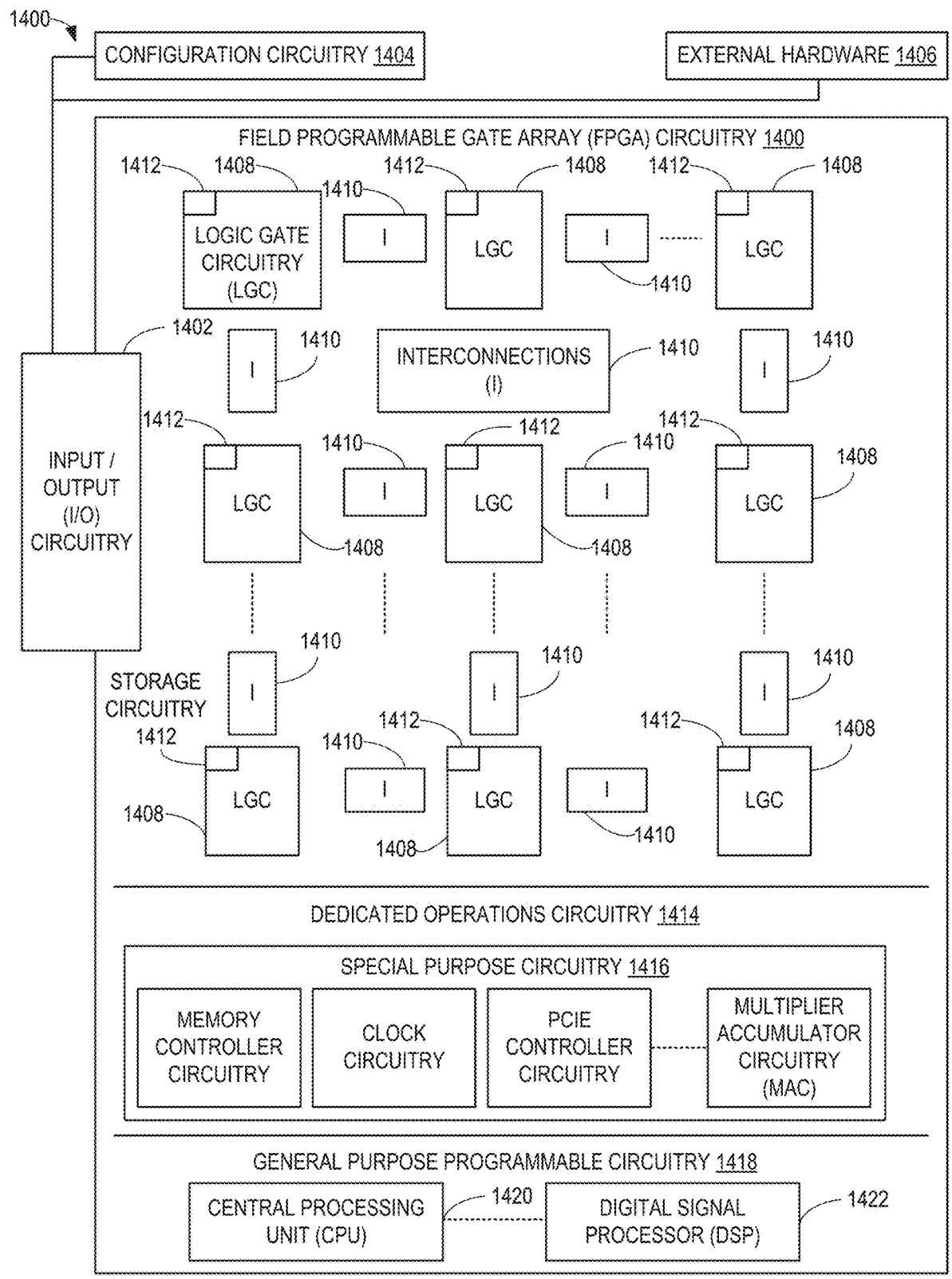
FIG. 14 is a block diagram of another example implementation of the processor circuitry of FIGS. 11 and/or 12.

FIG. 14 is a block diagram of another example implementation of the processor circuitry 1112 of FIG. 11 and/or the processor circuitry 1212 of FIG. 12. In this example, the processor circuitry 1112 and/or the processor circuitry 1212 is implemented by FPGA circuitry 1400. The FPGA circuitry 1400 can be used, for example, to perform operations that could otherwise be performed by the example microprocessor 1300 of FIG. 13 executing corresponding machine readable instructions. However, once configured, the FPGA circuitry 1400 instantiates the machine readable instructions in hardware and, thus, can often execute the operations faster than they could be performed by a general purpose microprocessor executing the corresponding software.

More specifically, in contrast to the microprocessor 1300 of FIG. 13 described above (which is a general purpose device that may be programmed to execute some or all of the machine readable instructions represented by the flowcharts of FIGS. 9 and/or 10 but whose interconnections and logic circuitry are fixed once fabricated), the FPGA circuitry 1400 of the example of FIG. 14 includes interconnections and logic circuitry that may be configured and/or interconnected in different ways after fabrication to instantiate, for example, some or all of the machine readable instructions represented by the flowcharts of FIGS. 9 and/or 10. In particular, the FPGA 1400 may be thought of as an array of logic gates, interconnections, and switches. The switches can be programmed to change how the logic gates are interconnected by the interconnections, effectively forming one or more dedicated logic circuits (unless and until the FPGA circuitry 1400 is reprogrammed). The configured logic circuits enable the logic gates to cooperate in different ways to perform different operations on data received by input circuitry. Those operations may correspond to some or all of the software represented by the flowcharts of FIGS. 9 and/or 10. As such, the FPGA circuitry 1400 may be structured to effectively instantiate some or all of the machine readable instructions of the flowcharts of FIGS. 9 and/or 10 as dedicated logic circuits to perform the operations corresponding to those software instructions in a dedicated manner analogous to an ASIC. Therefore, the FPGA circuitry 1400 may perform the operations corresponding to the some or all of the machine readable instructions of FIG. 14 faster than the general purpose microprocessor can execute the same.

In the example of FIG. 14, the FPGA circuitry 1400 is structured to be programmed (and/or reprogrammed one or more times) by an end user by a hardware description language (HDL) such as Verilog. The FPGA circuitry 1400 of FIG. 14, includes example input/output (I/O) circuitry 1402 to obtain and/or output data to/from example configuration circuitry 1404 and/or external hardware (e.g., external hardware circuitry) 1406. For example, the configuration circuitry 1404 may implement interface circuitry that may obtain machine readable instructions to configure the FPGA circuitry 1400, or portion(s) thereof. In some such examples, the configuration circuitry 1404 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1406 may implement the microprocessor 1300 of FIG. 13. The FPGA circuitry 1400 also includes an array of example logic gate circuitry 1408, a plurality of example configurable interconnections 1410, and example storage circuitry 1412. The logic gate circuitry 1408 and interconnections 1410 are configurable to instantiate one or more operations that may correspond to at least some of the machine readable instructions of FIG. 14 and/or other desired operations. The logic gate circuitry 1408 shown in FIG. 14 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1408 to enable configuration of the electrical structures and/or the logic gates to form circuits to perform desired operations. The logic gate circuitry 1408 may include other electrical structures such as look-up tables (LUTs), registers (e.g., flip-flops or latches), multiplexers, etc.

The interconnections 1410 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1408 to program desired logic circuits.

The storage circuitry 1412 of the illustrated example is structured to store result(s) of the one or more of the operations performed by corresponding logic gates. The storage circuitry 1412 may be implemented by registers or the like. In the illustrated example, the storage circuitry 1412 is distributed amongst the logic gate circuitry 1408 to facilitate access and increase execution speed.

The example FPGA circuitry 1400 of FIG. 14 also includes example Dedicated Operations Circuitry 1414. In this example, the Dedicated Operations Circuitry 1414 includes special purpose circuitry 1416 that may be invoked to implement commonly used functions to avoid the need to program those functions in the field. Examples of such special purpose circuitry 1416 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1400 may also include example general purpose programmable circuitry 1418 such as an example CPU 1420 and/or an example DSP 1422. Other general purpose programmable circuitry 1418 may additionally or alternatively be present such as a GPU, an XPU, etc., that can be programmed to perform other operations.

Although FIGS. 13 and 14 illustrate two example implementations of the processor circuitry 1112 of FIG. 11 and/or the processor circuitry 1212 of FIG. 12, many other approaches are contemplated. For example, as mentioned above, modern FPGA circuitry may include an on-board CPU, such as one or more of the example CPU 1420 of FIG. 14. Therefore, the processor circuitry 1112 of FIG. 11 and/or the processor circuitry 1212 of FIG. 12 may additionally be implemented by combining the example microprocessor 1300 of FIG. 13 and the example FPGA circuitry 1400 of FIG. 14. In some such hybrid examples, a first portion of the machine readable instructions represented by the flowcharts of FIGS. 9 and/or 10 may be executed by one or more of the cores 1302 of FIG. 13 and a second portion of the machine readable instructions represented by the flowcharts of FIGS. 9 and/or 10 may be executed by the FPGA circuitry 1400 of FIG. 14.

In some examples, the processor circuitry 1112 of FIG. 11 and/or the processor circuitry 1212 of FIG. 12 may be in one or more packages. For example, the processor circuitry 1300 of FIG. 13 and/or the FPGA circuitry 1400 of FIG. 14 may be in one or more packages. In some examples, an XPU may be implemented by the processor circuitry 1112 of FIG. 11 and/or the processor circuitry 1212 of FIG. 12, which may be in one or more packages. For example, the XPU may include a CPU in one package, a DSP in another package, a GPU in yet another package, and an FPGA in still yet another package.

Figure 15:
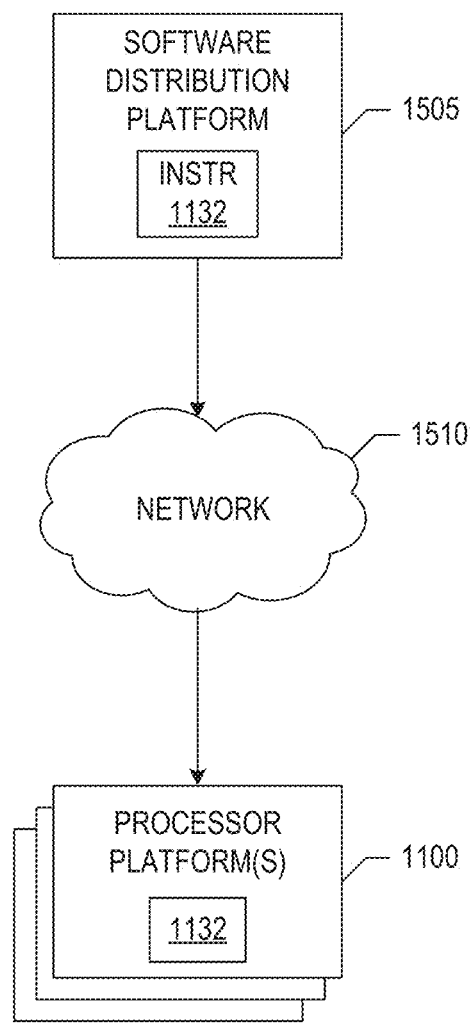
FIG. 15 is a block diagram of an example software distribution platform (e.g., one or more servers) to distribute software (e.g., software corresponding to the example machine readable instructions of FIG. 9) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1505 to distribute software such as the example machine readable instructions 1132 of FIG. 11 to hardware devices owned and/or operated by third parties is illustrated in FIG. 15. The example software distribution platform 1505 may be implemented by any computer server, data facility, cloud service, etc., capable of storing and transmitting software to other computing devices. The third parties may be customers of the entity owning and/or operating the software distribution platform 1505. For example, the entity that owns and/or operates the software distribution platform 1505 may be a developer, a seller, and/or a licensor of software such as the example machine readable instructions 1132 of FIG. 11. The third parties may be consumers, users, retailers, OEMs, etc., who purchase and/or license the software for use and/or re-sale and/or sub-licensing. In the illustrated example, the software distribution platform 1505 includes one or more servers and one or more storage devices. The storage devices store the machine readable instructions 1132, which may correspond to the example machine readable instructions 900 of FIG. 9, as described above. The one or more servers of the example software distribution platform 1505 are in communication with a network 1510, which may correspond to any one or more of the Internet and/or the example network 107 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1132 from the software distribution platform 1205. For example, the software, which may correspond to the example machine readable instructions 900 of FIG. 9, may be downloaded to the example processor platform 1100, which is to execute the machine readable instructions 1132 to implement the sensor control circuitry 104. In some examples, one or more servers of the software distribution platform 1505 periodically offer, transmit, and/or force updates to the software (e.g., the example machine readable instructions 1132 of FIG. 11) to ensure improvements, patches, updates, etc., are distributed and applied to the software at the end user devices.

From the foregoing, it will be appreciated that example systems, methods, apparatus, and articles of manufacture have been disclosed that generate calibration models in a cloud environment. Examples disclosed herein enable crowdsourcing of data from multiple vehicles for use by example calibration model control circuitry to generate the calibration models. The data can include reference data resulting from analytical testing of physical samples collected by the vehicles and spectra associated with the physical samples, where the spectra is gathered by one or more spectrometers of the vehicles. Examples disclosed herein generate the calibration models based on initial calibration models for similar crop types and/or based on correlation of the spectra and the reference data. By enabling the calibration model control circuitry to continuously and/or periodically update the calibration models based on new data from the vehicles, examples disclosed herein improve accuracy of predictions using the calibration models. Furthermore, the disclosed systems, methods, apparatus, and articles of manufacture improve the efficiency of using a computing device by enabling training and/or generation of calibration models in a cloud environment, thus reducing the computational load on processor circuitry implemented locally at each vehicle. The disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to generate calibration models in a cloud environment are disclosed herein. Further examples and combinations thereof include the following:

Example 1 includes an apparatus comprising training circuitry to generate a calibration model based on a correlation of reference data and spectra, the reference data based on physical samples collected by one or more vehicles, the spectra associated with the physical samples, and distribution circuitry to provide, via a network communication, the calibration model to the one or more vehicles.

Example 2 includes the apparatus of example 1, further including initialization circuitry to select an initial calibration model based on a crop type of the physical samples, the training circuitry to generate the calibration model by training the initial calibration model based on the reference data and the spectra.

Example 3 includes the apparatus of example 1, further including uncertainty estimation circuitry to determine a measurement uncertainty associated with the calibration model, the measurement uncertainty based on a quantity of the physical samples.

Example 4 includes the apparatus of example 1, wherein the training circuitry is to obtain the spectra from one or more near infrared (NIR) spectrometers implemented on the one or more vehicles.

Example 5 includes the apparatus of example 1, wherein the training circuitry is to train the calibration model to output at least one of (a) one or more constituent materials in the physical samples or (b) quantities of the one or more constituent materials.

Example 6 includes the apparatus of example 1, wherein the training circuitry is to obtain a unique identifier from the reference data and the spectra, and correlate the reference data and the spectra based on the unique identifier.

Example 7 includes the apparatus of example 1, wherein the reference data includes analytical results from laboratory testing of the physical samples.

Example 8 includes a non-transitory computer readable medium comprising instructions that, when executed, cause processor circuitry to at least obtain reference data based on physical samples collected by one or more vehicles, obtain spectra associated with the physical samples, generate a calibration model based on a correlation of the reference data and the spectra, and provide, via a network communication, the calibration model to the one or more vehicles.

Example 9 includes the non-transitory computer readable medium of example 8, wherein the instructions, when executed, cause the processor circuitry to select an initial calibration model based on a crop type of the physical samples, and generate the calibration model by training the initial calibration model based on the reference data and the spectra.

Example 10 includes the non-transitory computer readable medium of example 8, wherein the instructions, when executed, cause the processor circuitry to determine a measurement uncertainty associated with the calibration model, the measurement uncertainty based on a quantity of the physical samples.

Example 11 includes the non-transitory computer readable medium of example 8, wherein the instructions, when executed, cause the processor circuitry to obtain the spectra from one or more near infrared (NIR) spectrometers implemented on the one or more vehicles.

Example 12 includes the non-transitory computer readable medium of example 8, wherein the instructions, when executed, cause the processor circuitry to train the calibration model to output at least one of (a) one or more constituent materials in the physical samples or (b) quantities of the one or more constituent materials.

Example 13 includes the non-transitory computer readable medium of example 8, wherein the instructions, when executed, cause the processor circuitry to obtain a unique identifier from the reference data and the spectra, the processor circuitry to correlate the reference data and the spectra based on the unique identifier.

Example 14 includes the non-transitory computer readable medium of example 8, wherein the reference data includes analytical results from laboratory testing of the physical samples.

Example 15 includes an apparatus comprising means for training to generate a calibration model based on a correlation of reference data and spectra, the reference data based on physical samples collected by one or more vehicles, the spectra associated with the physical samples, and means for distributing to provide, via a network communication, the calibration model to the one or more vehicles.

Example 16 includes the apparatus of example 15, further including means for initializing to select an initial calibration model based on a crop type of the physical samples, the means for training to generate the calibration model by training the initial calibration model based on the reference data and the spectra.

Example 17 includes the apparatus of example 15, further including means for estimating uncertainty to determine a measurement uncertainty associated with the calibration model, the measurement uncertainty based on a quantity of the physical samples.

Example 18 includes the apparatus of example 15, wherein the means for training is to obtain the spectra from one or more near infrared (NIR) spectrometers implemented on the one or more vehicles.

Example 19 includes the apparatus of example 15, wherein the means for training is to train the calibration model to output at least one of (a) one or more constituent materials in the physical samples or (b) quantities of the one or more constituent materials.

Example 20 includes the apparatus of example 15, wherein the means for training is to obtain a unique identifier from the reference data and the spectra, and correlate the reference data and the spectra based on the unique identifier.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
a first sensor and a second sensor positioned on a first vehicle;
training circuitry to:
select, from a database including pre-trained neural networks corresponding to respective different crop types, a first pre-trained neural network corresponding to a first crop type similar to a second crop type of a harvested crop sample; and
generate a calibration neural network based on a correlation of reference data and spectra, the reference data and the spectra based on physical samples collected by a sampling system of the first vehicle, the spectra obtained by the first sensor having a first accuracy, the reference data obtained by the second sensor having a second accuracy, the second accuracy greater than the first accuracy, the physical samples including at least one of a soil sample or the harvested crop sample from a field, wherein the calibration neural network is generated by adjusting, based on the correlation, parameters of the first pre-trained neural network, the calibration neural network to predict the reference data when the spectra is provided as input to the calibration neural network;

uncertainty estimation circuitry to determine, based on a quantity of the physical samples, a measurement uncertainty associated with the calibration neural network; and distribution circuitry to provide, via a network communication, the calibration neural network and the measurement uncertainty to at least one of the first vehicle or one or more second vehicles, the measurement uncertainty to trigger collection of additional physical samples by the sampling system when the measurement uncertainty does not satisfy a threshold.

2. The apparatus of claim 1, further including initialization circuitry to select an initial calibration neural network based on a crop type of the physical samples, the training circuitry to generate the calibration neural network by training the initial calibration neural network based on the reference data and the spectra.

3. The apparatus of claim 1, wherein the first sensor includes one or more near infrared (NIR) spectrometers.

4. The apparatus of claim 1, wherein the training circuitry is to train the calibration neural network to output at least one of (a) one or more constituent materials in the physical samples or (b) quantities of the one or more constituent materials.

5. The apparatus of claim 1, wherein the training circuitry is to:
obtain a unique identifier from the reference data and the spectra; and
correlate the reference data and the spectra based on the unique identifier.

6. The apparatus of claim 1, wherein the reference data includes analytical results from laboratory testing of the physical samples.

7. The apparatus of claim 1, wherein the uncertainty estimation circuitry is to determine a confidence level associated with the measurement uncertainty, the measurement uncertainty associated with a predicted value output by the calibration neural network based on the spectra, the confidence level representative of a likelihood of a deviation between the predicted value and a reference value from the reference data being less than the measurement uncertainty.

8. The apparatus of claim 1, wherein the first sensor is a reflective sensor and the second sensor is a transmission sensor.

9. A non-transitory computer readable medium comprising instructions that, when executed, cause processor circuitry to at least:
obtain, from a first sensor positioned on a first vehicle and having a first accuracy, reference data based on physical samples collected by a sampling system of the first vehicle, the physical samples including at least one of a soil sample or a harvested crop sample from a field;
obtain, from a second sensor positioned on the first vehicle and having a second accuracy less than the first accuracy, spectra based on the physical samples;
select, from a database including pre-trained neural networks corresponding to respective different crop types, a first pre-trained neural network corresponding to a first crop type similar to a second crop type of the harvested crop sample;
generate a calibration neural network based on a correlation of the reference data and the spectra, wherein the calibration neural network is generated by adjusting, based on the correlation, parameters of the first pre-trained neural network, the calibration neural network to predict the reference data when the spectra is provided as input to the calibration neural network;
determine, based on a quantity of the physical samples, a measurement uncertainty associated with the calibration neural network; and
provide, via a network communication, the calibration neural network and the measurement uncertainty to at least one of the first vehicle or one or more second vehicles, the measurement uncertainty to trigger collection of additional physical samples by the sampling system when the measurement uncertainty does not satisfy a threshold.

10. The non-transitory computer readable medium of claim 9, wherein the instructions, when executed, cause the processor circuitry to:
select an initial calibration neural network based on a crop type of the physical samples; and
generate the calibration neural network by training the initial calibration neural network based on the reference data and the spectra.

11. The non-transitory computer readable medium of claim 9, wherein the second sensor includes one or more near infrared (NIR) spectrometers.

12. The non-transitory computer readable medium of claim 9, wherein the instructions, when executed, cause the processor circuitry to train the calibration neural network to output at least one of (a) one or more constituent materials in the physical samples or (b) quantities of the one or more constituent materials.

13. The non-transitory computer readable medium of claim 9, wherein the instructions, when executed, cause the processor circuitry to obtain a unique identifier from the reference data and the spectra, the processor circuitry to correlate the reference data and the spectra based on the unique identifier.

14. The non-transitory computer readable medium of claim 9, wherein the reference data includes analytical results from laboratory testing of the physical samples.

15. An apparatus comprising:
first means for measuring and second means for measuring positioned on a first vehicle;
means for training to:
select, from a database including pre-trained neural networks corresponding to respective different crop types, a first pre-trained neural network corresponding to a first crop type similar to a second crop type of a harvested crop sample; and
generate a calibration neural network based on a correlation of reference data and spectra, the reference data and the spectra based on physical samples collected by a sampling system of the first vehicle, the spectra obtained by the first means for measuring having a first accuracy, the reference data obtained by the second means for measuring having a second accuracy, the second accuracy greater than the first accuracy, the physical samples including at least one of a soil sample or the harvested crop sample from a field, wherein the calibration neural network is generated by adjusting, based on the correlation, parameters of the first pre-trained neural network, the calibration neural network to predict the reference data when the spectra is provided as input to the calibration neural network;

means for estimating uncertainty to determine, based on a quantity of the physical samples, a measurement uncertainty associated with the calibration neural network; and means for distributing to provide, via a network communication, the calibration neural network and the measurement uncertainty to at least one of the first vehicle or one or more second vehicles, the measurement uncertainty to trigger collection of additional physical samples by the sampling system when the measurement uncertainty does not satisfy a threshold.

16. The apparatus of claim 15, further including means for initializing to select an initial calibration neural network based on a crop type of the physical samples, the means for training to generate the calibration neural network by training the initial calibration neural network based on the reference data and the spectra.

17. The apparatus of claim 15, wherein the first means for measuring includes one or more near infrared (NIR) spectrometers.

18. The apparatus of claim 15, wherein the means for training is to train the calibration neural network to output at least one of (a) one or more constituent materials in the physical samples or (b) quantities of the one or more constituent materials.

19. The apparatus of claim 15, wherein the means for training is to:
  obtain a unique identifier from the reference data and the spectra; and
  correlate the reference data and the spectra based on the unique identifier.

* * * * *